(12) United States Patent
Futaki

(10) Patent No.: US 11,452,086 B2
(45) Date of Patent: *Sep. 20, 2022

(54) RADIO STATION, RADIO TERMINAL, AND METHOD FOR TERMINAL MEASUREMENT

(71) Applicant: NEC Corporation, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,528

(22) Filed: Sep. 11, 2020

(65) Prior Publication Data

US 2020/0413385 A1 Dec. 31, 2020

Related U.S. Application Data

(63) Continuation of application No. 16/207,517, filed on Dec. 3, 2018, now Pat. No. 10,798,694, which is a
(Continued)

(30) Foreign Application Priority Data

Sep. 12, 2014 (JP) ................................ 2014-186949

(51) Int. Cl.
*H04W 72/04* (2009.01)
*H04W 16/14* (2009.01)
(Continued)

(52) U.S. Cl.
CPC ......... *H04W 72/042* (2013.01); *H04L 5/0053* (2013.01); *H04W 16/14* (2013.01);
(Continued)

(58) Field of Classification Search
CPC ..... H04W 76/16; H04W 88/06; H04W 16/14; H04W 24/10; H04W 72/04;
(Continued)

(56) References Cited

U.S. PATENT DOCUMENTS 7,443,821 B2   10/2008  Cave et al.
8,452,311 B1 *  5/2013  Leshets ............... H04W 68/025
                                                  455/458
(Continued)

FOREIGN PATENT DOCUMENTS

CN     103621130 A    3/2014
EP       2843856 A1   3/2015
(Continued)

OTHER PUBLICATIONS

3GPP Ran #62, , RP131635, "Introducing LTE in Unlicensed Spectrum," Qualcomm, Erricsson, Busan, South Korea, Dec. 3-7, 2013, 8 pp.
(Continued)

*Primary Examiner* — Dung B Huynh

(57) ABSTRACT

A radio station (1) transmits, to a radio terminal (3) on a licensed frequency (Cell #1), control signaling (S102) associated with at least one of a measurement timing and a measurement period of terminal measurement on an unlicensed frequency (Cell #2) and receives, from the radio terminal (3) on the licensed frequency (Cell #1), a result of the terminal measurement that is executed in response to the control signaling (S102) and in accordance with at least one of the measurement timing and the measurement period (S105). This contributes, for example, to acquisition of information useful for the radio station to determine whether to allow the radio terminal to perform communication on the unlicensed frequency.

10 Claims, 15 Drawing Sheets

Related U.S. Application Data continuation of application No. 15/508,332, filed as application No. PCT/JP2015/002119 on Apr. 17, 2015, now Pat. No. 10,182,430.

(51) Int. Cl.
*H04W 24/10* (2009.01)
*H04L 5/00* (2006.01)

(52) U.S. Cl.
CPC ........... *H04W 24/10* (2013.01); *H04W 72/04* (2013.01); *H04W 72/0446* (2013.01); *H04W 72/0453* (2013.01)

(58) Field of Classification Search
CPC ........... H04W 72/042; H04W 72/0446; H04W 72/0453; H04L 5/0053
See application file for complete search history.

(56) References Cited

U.S. PATENT DOCUMENTS

| | | | | |
|---|---|---|---|---|
| 8,547,867 | B2 * | 10/2013 | Koo | H04W 88/06 370/465 |
| 8,965,414 | B2 | 2/2015 | Siomina et al. | |
| 9,253,676 | B2 | 2/2016 | Park et al. | |
| 2004/0116110 | A1 * | 6/2004 | Amerga | H04W 48/16 455/449 |
| 2004/0264504 | A1 | 12/2004 | Jin | |
| 2006/0099956 | A1 | 5/2006 | Harada et al. | |
| 2006/0171341 | A1 | 8/2006 | Wang et al. | |
| 2006/0251119 | A1 | 11/2006 | Ramesh | |
| 2007/0207824 | A1 * | 9/2007 | Bhattacharjee | H04W 24/10 455/524 |
| 2007/0249341 | A1 | 10/2007 | Chu et al. | |
| 2009/0059805 | A1 | 3/2009 | Choi et al. | |
| 2009/0170441 | A1 | 7/2009 | Eckert et al. | |
| 2010/0246506 | A1 | 9/2010 | Krishnaswamy | |
| 2010/0272004 | A1 | 10/2010 | Maeda et al. | |
| 2010/0296410 | A1 * | 11/2010 | Kazmi | H04W 24/10 370/252 |
| 2011/0058505 | A1 | 3/2011 | Pan et al. | |
| 2011/0063989 | A1 | 3/2011 | Yang et al. | |
| 2011/0081868 | A1 * | 4/2011 | Kim | H04W 24/10 455/67.11 |
| 2011/0085465 | A1 * | 4/2011 | Lindoff | H04J 11/0069 370/252 |
| 2011/0096770 | A1 | 4/2011 | Henry | |
| 2011/0216682 | A1 | 9/2011 | Xu et al. | |
| 2011/0298598 | A1 | 12/2011 | Rhee | |
| 2012/0003972 | A1 * | 1/2012 | Boixadera | H04W 36/14 455/552.1 |
| 2012/0014357 | A1 | 1/2012 | Jung et al. | |
| 2012/0063324 | A1 | 3/2012 | Kim et al. | |
| 2012/0178465 | A1 | 7/2012 | Lin et al. | |
| 2012/0184222 | A1 | 7/2012 | Seok | |
| 2012/0184290 | A1 | 7/2012 | Kazmi et al. | |
| 2012/0213162 | A1 | 8/2012 | Koo et al. | |
| 2012/0307660 | A1 * | 12/2012 | Lindoff | H04L 25/03343 370/252 |
| 2013/0005339 | A1 | 1/2013 | Iwamura | |
| 2013/0010709 | A1 | 1/2013 | Earnshaw et al. | |
| 2013/0016690 | A1 | 1/2013 | Jeong et al. | |
| 2013/0059610 | A1 * | 3/2013 | Siomina | H04W 64/00 455/456.6 |
| 2013/0109395 | A1 | 5/2013 | Szufarska et al. | |
| 2013/0130687 | A1 * | 5/2013 | Kumar Reddy | H04W 36/08 455/67.11 |
| 2013/0136046 | A1 * | 5/2013 | Wurm | H04W 48/16 370/311 |
| 2013/0163569 | A1 | 6/2013 | Lee et al. | |
| 2013/0165134 | A1 | 6/2013 | Touag et al. | |
| 2013/0208587 | A1 | 8/2013 | Bala et al. | |
| 2013/0267246 | A1 | 10/2013 | Wang et al. | |
| 2013/0286906 | A1 | 10/2013 | Seo et al. | |
| 2014/0022998 | A1 | 1/2014 | Tajima et al. | |
| 2014/0029570 | A1 | 1/2014 | Lee et al. | |
| 2014/0038598 | A1 * | 2/2014 | Ren | H04W 48/16 455/434 |
| 2014/0056220 | A1 | 2/2014 | Poitau et al. | |
| 2014/0087715 | A1 | 3/2014 | Suzuki et al. | |
| 2014/0146697 | A1 | 5/2014 | Kim et al. | |
| 2014/0200016 | A1 * | 7/2014 | Siomina | H04W 28/20 455/450 |
| 2014/0213261 | A1 * | 7/2014 | Das | H04W 36/0085 455/437 |
| 2014/0235246 | A1 | 8/2014 | Lin et al. | |
| 2014/0301351 | A1 | 10/2014 | Gao et al. | |
| 2014/0301371 | A1 | 10/2014 | Maeda et al. | |
| 2014/0302865 | A1 | 10/2014 | Bai et al. | |
| 2014/0341192 | A1 | 11/2014 | Venkob et al. | |
| 2014/0341207 | A1 | 11/2014 | Bhushan et al. | |
| 2014/0362750 | A1 | 12/2014 | Song et al. | |
| 2015/0050939 | A1 * | 2/2015 | Futaki | H04W 16/14 455/552.1 |
| 2015/0103782 | A1 | 4/2015 | Xu et al. | |
| 2015/0117287 | A1 | 4/2015 | Kim et al. | |
| 2015/0133122 | A1 | 5/2015 | Chen | |
| 2015/0139053 | A1 | 5/2015 | Van Lieshout et al. | |
| 2015/0155894 | A1 * | 6/2015 | Dakshinamurthy | H03F 3/24 455/283 |
| 2015/0156650 | A1 | 6/2015 | Li et al. | |
| 2015/0156695 | A1 | 6/2015 | Zhang et al. | |
| 2015/0189574 | A1 | 7/2015 | Ng et al. | |
| 2015/0215825 | A1 | 7/2015 | Kim et al. | |
| 2015/0215827 | A1 | 7/2015 | Zhang et al. | |
| 2015/0223243 | A1 * | 8/2015 | Tabet | H04L 5/0073 370/330 |
| 2015/0223244 | A1 | 8/2015 | Tabet et al. | |
| 2015/0264636 | A1 * | 9/2015 | Han | H04B 17/24 370/252 |
| 2015/0271692 | A1 | 9/2015 | Han et al. | |
| 2015/0289293 | A1 | 10/2015 | Zhang et al. | |
| 2015/0304853 | A1 | 10/2015 | Murray et al. | |
| 2015/0312775 | A1 * | 10/2015 | Yi | H04W 16/00 370/254 |
| 2015/0312888 | A1 | 10/2015 | Li et al. | |
| 2015/0319701 | A1 | 11/2015 | Ng et al. | |
| 2015/0319753 | A1 | 11/2015 | Chen et al. | |
| 2015/0327054 | A1 * | 11/2015 | Callender | H04W 8/183 370/329 |
| 2015/0327322 | A1 | 11/2015 | Huang et al. | |
| 2015/0350941 | A1 * | 12/2015 | You | H04W 84/045 370/252 |
| 2015/0351115 | A1 | 12/2015 | Jeon et al. | |
| 2015/0358094 | A1 * | 12/2015 | Yi | H04W 48/10 370/252 |
| 2015/0365931 | A1 | 12/2015 | Ng et al. | |
| 2016/0007181 | A1 * | 1/2016 | Palin | H04B 17/318 455/41.2 |
| 2016/0007350 | A1 | 1/2016 | Xiong et al. | |
| 2016/0007406 | A1 * | 1/2016 | Yi | H04W 24/02 370/252 |
| 2016/0014610 | A1 | 1/2016 | Wong et al. | |
| 2016/0037443 | A1 | 2/2016 | Kim et al. | |
| 2016/0037525 | A1 * | 2/2016 | Malmirchegini | H04W 16/10 370/329 |
| 2016/0043848 | A1 * | 2/2016 | Kim | H04L 5/0016 370/335 |
| 2016/0044543 | A1 * | 2/2016 | Nemeth | H04W 36/0088 370/332 |
| 2016/0044667 | A1 | 2/2016 | Chen et al. | |
| 2016/0057658 | A1 | 2/2016 | Horn et al. | |
| 2016/0066325 | A1 | 3/2016 | Kim et al. | |
| 2016/0073265 | A1 | 3/2016 | Vutukuri et al. | |
| 2016/0073344 | A1 | 3/2016 | Vutukuri et al. | |
| 2016/0073366 | A1 | 3/2016 | Ng et al. | |
| 2016/0073428 | A1 | 3/2016 | Vutukuri et al. | |
| 2016/0142898 | A1 | 5/2016 | Poitau et al. | |
| 2016/0183167 | A1 | 6/2016 | Agiwal et al. | |
| 2016/0183276 | A1 | 6/2016 | Marinier et al. | |
| 2016/0192339 | A1 * | 6/2016 | Axmon | H04B 17/318 370/329 |

(56) References Cited

U.S. PATENT DOCUMENTS

| | | | |
|---|---|---|---|
| 2016/0205704 A1 | 7/2016 | Aiba et al. | |
| 2016/0219453 A1* | 7/2016 | Harada | H04L 5/001 |
| 2016/0227526 A1 | 8/2016 | Park et al. | |
| 2016/0227571 A1 | 8/2016 | Baek et al. | |
| 2016/0262100 A1* | 9/2016 | Larsson | H04W 52/0216 |
| 2016/0269260 A1* | 9/2016 | Kazmi | H04W 72/085 |
| 2016/0269955 A1 | 9/2016 | Lin | |
| 2016/0270036 A1 | 9/2016 | Olsson et al. | |
| 2016/0301504 A1 | 10/2016 | Toskala et al. | |
| 2016/0309491 A1 | 10/2016 | Dai et al. | |
| 2016/0330641 A1* | 11/2016 | Zhang | H04W 72/0453 |
| 2016/0330669 A1 | 11/2016 | Li et al. | |
| 2016/0337997 A1 | 11/2016 | Huang et al. | |
| 2016/0360452 A1* | 12/2016 | Koorapaty | H04J 11/0076 |
| 2017/0013622 A1 | 1/2017 | Taylor | |
| 2017/0041773 A1 | 2/2017 | Fujishiro et al. | |
| 2017/0048041 A1* | 2/2017 | Yi | H04W 72/042 |
| 2017/0070312 A1* | 3/2017 | Yi | H04W 4/06 |
| 2017/0086214 A1* | 3/2017 | Kalhan | H04W 72/082 |
| 2017/0094550 A1* | 3/2017 | Shi | H04W 24/10 |
| 2017/0118784 A1 | 4/2017 | Chen | |
| 2017/0142738 A1* | 5/2017 | You | H04L 5/001 |
| 2017/0142759 A1 | 5/2017 | Jung et al. | |
| 2017/0164177 A1 | 6/2017 | Wang et al. | |
| 2017/0181022 A1 | 6/2017 | Yang et al. | |
| 2017/0208588 A1 | 7/2017 | Park et al. | |
| 2017/0215082 A1 | 7/2017 | Hwang et al. | |
| 2017/0238272 A1* | 8/2017 | You | H04L 5/001 370/350 |
| 2017/0238341 A1* | 8/2017 | Liu | H04W 56/00 370/336 |
| 2017/0332266 A1 | 11/2017 | Futaki et al. | |
| 2018/0175975 A1* | 6/2018 | Um | H04W 24/10 |
| 2021/0289364 A1* | 9/2021 | Patel | H04W 72/1242 |

FOREIGN PATENT DOCUMENTS

| | | |
|---|---|---|
| JP | 2013-521719 A | 6/2013 |
| JP | 2013-541285 A | 11/2013 |
| JP | 2014-500685 A | 1/2014 |
| JP | 2014-506421 A | 3/2014 |
| JP | 2014-514787 A | 6/2014 |
| JP | 2015-508958 A | 3/2015 |
| WO | WO-2011/109647 A1 | 9/2011 |
| WO | WO-2013/112983 A2 | 8/2013 |
| WO | WO-2013/133630 A1 | 9/2013 |
| WO | WO-2013/161135 A1 | 10/2013 |
| WO | WO-2014/035676 A1 | 3/2014 |

OTHER PUBLICATIONS

3GPP TR 36.842 V12.0.0 3rd Generation Partnership Project; Technical Specification Group Radio Access Network; Study on Small Cell Enhancements for E-UTRA and E-UTRAN; Higher layer aspects (Release 12) (Dec. 2013), 71 pp.

3GPP TS 36.300 V12.2.0 Evolved Universal Terrestrial Radio Access (E-UTRA) and Evolved Universal Terrestrial Radio Access Network (E-UTRAN; Overall description; Stage 2 (Release 12) (Jun. 2014), 215 pp.

3GPP TS 36.331 V12.2.0 3rd Generation Partnership Project; Technical Specification Group Radio Access Network; Evolved Universal Terrestrial Radio Access (E-UTRA); Radio Resource Control (RRC); Protocol Specification (Release 12), (Jun. 2014), 365 pp.

3GPP TSG RAN Meeting #65, Edinburgh, Scotland; ZTE, Qualcomm Inc.; Supporting Dual Connectivity in LTE-U, RP-141470 (Sep. 9, 2014) 6 pp.

3GPP Workshop on LTE in Unlicensed Spectrum: European Regulation and Co-existence Considerations, RWS-140002; Sari Nielsen & Antti Toskala, Nokia Corporation, NSN; Sophia Antipolis, France, Jun. 13, 2014, 13 pp.

China Notification of First Office Action issued in Chinese Patent Application No. 201580049238.6, dated Oct. 28, 2019, 13 pages.

International Search Report, Corresponding to PCT/JP2015/002119, dated Jun. 30, 2015, 2 pp.

Japanese Notice of Reasons for Refusal issued in Japanese Patent Application No. 2016-547655, dated Apr. 23, 2019, 12 pages.

China Notification to Grant Patent Right for Invention issued in Chinese Patent Application No. 201580049238.6, dated Aug. 6, 2020, 6 pages.

Japan Notice of Reasons for Refusal issued in Japanese Patent Application No. 2019-205396, dated Nov. 10, 2020, 8 pages.

Huawei, HiSilicon "Discussion on further clarifications on small cell on/off and discovery signal", 3GPP TSG RAN WG1 Meeting #78, R1-142974, Dresden, Germany, Aug. 18-Aug. 22, 2014, 7 pages.

Japanese Office Action for JP Application No. 2021-065058 dated Apr. 5, 2022 with English Translation.

Huawei, HiSilicon, Consideration on small cell on/off transition time reduction, 3GPP TSG-RAN WG2 #86 R2-142086, May 10, 2014.

\* cited by examiner

RADIO STATION, RADIO TERMINAL, AND METHOD FOR TERMINAL MEASUREMENT

CROSS-REFERENCE TO RELATED APPLICATIONS

The present application is a continuation of U.S. patent application Ser. No. 16/207,517, filed Dec. 3, 2018, now U.S. Pat. No. 10,798,694, which is a continuation of U.S. patent application Ser. No. 15/508,332, filed Mar. 2, 2017, now U.S. Pat. No. 10,182,430, which is a national stage application of International Application No. PCT/JP2015/002119 entitled "Wireless Station, Wireless Terminal, and Method for Terminal Measurement," filed on Apr. 17, 2015, which claims the benefit of priority from Japanese Patent Application No. JP2014-186949, filed on Sep. 12, 2014, the disclosures of which are incorporated herein in their entirety by reference thereto.

TECHNICAL FIELD

The present application relates to a radio communication system in which a radio station performs communication with a radio terminal on an unlicensed frequency or a shared frequency.

BACKGROUND ART

In order to improve the degradation of communication quality due to a sharp recent increase in mobile traffic and to provide faster 15 high-speed communication, the 3GPP Long Term Evolution (LTE) has specified the Carrier Aggregation (CA) function that enables a radio terminal (User Equipment (UE)) to communicate with a radio base station (eNode B (eNB)) by using a plurality of cells. Note that cells that a UE can use in CA are limited to a plurality of cells of a single eNB (i.e., a plurality of cells operated or managed by a single eNB). The cells used by the UE in CA are categorized into a primary cell (PCell) that has already been used as a serving cell when CA is started and a secondary cell(s) (SCell(s)) that is used additionally or in a dependent manner. In the PCell, when a radio connection is (re-)established (Radio Resource Control (RRC) Connection Establishment, RRC Connection Re-establishment), Non Access Stratum (NAS) mobility information and security information (security input) are transmitted (see section 7.5 of Non-Patent Literature 1).

From a functional point of view, the introduction of CA has enabled high-speed communication. In practical usage, however, it is considered that it would be difficult to address the issue of a further increase in mobile traffic in the future due to limitations (shortage) of frequencies allocated to each operator. Accordingly, in the 3GPP standardization process, discussions on Unlicensed LTE that executes LTE with the use of an unlicensed frequency (unlicensed frequency band, unlicensed spectrum) have been started (Non-Patent Literature 2 and 3). Unlicensed LTE is also referred to as LTE-U or U-LTE and is hereinafter referred to as LTE-U.

As methods for achieving LTE-U, two methods, i.e., Licensed Assisted Access (LAA) in which the eNB performs communication with the UE on the unlicensed frequency in association with the licensed frequency (e.g., as SCell of CA) and Standalone (SA) in which the eNB performs communication with the UE only on the unlicensed frequency, are considered. The unlicensed frequency is, for example, 5 GHz band, which is also used by other systems such as radar systems and wireless LAN (WLAN or also referred to as WiFi). Therefore, with regard to the SA scheme in which communication is performed only on the unlicensed frequency, it would be difficult to implement sophisticated controls specified for LTE and thus the more feasible LAA scheme (also referred to as LA-LTE) has mainly been discussed. In the following description, LTE-U by the LAA scheme, in which CA using the licensed frequency and the unlicensed frequency is performed, will be mainly explained. The licensed frequency means a dedicated frequency allocated to a specific operator. The unlicensed frequency means a frequency that is not allocated to a specific operator or a shared frequency allocated to a plurality of operators. In the latter case, this frequency may be referred to as a licensed shared frequency, not an unlicensed frequency, and communication using this frequency is also referred to as a Licensed Shared Access (LSA). In the following description, frequencies other than licensed frequencies licensed only to any specific operators are collectively referred to as an unlicensed frequency.

LTE-U by the LAA scheme is basically executed in accordance with the sequence shown in FIG. 15. In this example, it is assumed that the eNB performs data transmission (or reception) with a UE #1 in a Cell #1, which is the licensed frequency, and a cell #2, which is the unlicensed frequency. First, a radio connection is established between the eNB and the UE #1 in the Cell #1 (RRC Connection Establishment, S901) and a bearer is established between a core network (Evolved Packet Core: EPC) and the UE #1 (not shown). That is, the Cell #1 becomes the PCell for the UE #1. When there is downlink (DL) user data (also referred to as User Plane (UP) data) to be transmitted to the UE #1 or when there is uplink (UL) user data that the UE #1 wants to transmit, the eNB transmits or receives this user data in the Cell #1 (DL (or UL) UP data transmission, S902).

Next, when the eNB determines that it is efficient for the UE #1 to transmit and receive user data in the Cell #2 at some point (Trigger LTE-U for UE #1, S903), the eNB transmits, to the UE #1 in the Cell #1, control information about radio resource configuration for the Cell #2 (Radio Resource Configuration for Cell #2, S904). This control information corresponds to a RadioResourceConfigDedicated Information Element (IE) and a RadioResourceConfigCommon IE transmitted in an RRC Connection Reconfiguration message of the LTE (Non-Patent Literature 4). The Cell #2 hereby becomes the SCell for the UE #1. When the user data is transmitted in the downlink, the eNB performs sensing in the Cell #2 to determine whether the Cell #2 is available (Perform channel sensing. S905). Upon determining that the Cell #2 is available, the eNB transmits or receives user data to or from the UE #1 (DL (or UL) UP data transmission, S906). As described above, by the use of the unlicensed frequency, it is expected that the throughput will be further improved or the cell capacity will be increased.

The aforementioned sensing is referred to as Listen Before Talk (LBT) (Non-Patent Literature 2), which determines whether LTE-U by another operator or communication of another radio system (e.g., WLAN) is performed nearby on the target unlicensed frequency. The aforementioned sensing corresponds to, for example, Channel Availability Check (CAC) for radar systems and Clear Channel Assessment (CCA) executed by a WLAN Access Point (AP) (Patent Literature 1).

CITATION LIST

Non-Patent Literature

[Non-Patent Literature 1] 3GPP TS 36.300 V12.2.0 (2014-06), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", June, 2014

[Non-Patent Literature 2] 3GPP RP-131635, "Introducing LTE in Unlicensed Spectrum", Qualcomm, Ericsson, December, 2013

[Non-Patent Literature 3] 3GPP workshop on LTE in unlicensed spectrum, RWS-140002, "LTE in Unlicensed Spectrum: European Regulation and Co-existence Considerations", Nokia, June, 2014

[Non-Patent Literature 4] 3GPP TS 36.331 V12.2.0 (2014-06), "3rd Generation Partnership Project; Technical Specification Group Radio Access Network; Evolved Universal Terrestrial Radio Access (E-UTRA); Radio Resource Control (RRC); Protocol specification (Release 12)", June, 2014

[Non-Patent Literature 5] 3GPP TR 36.842 V12.0.0 (2013-12), "3rd Generation Partnership Project; Technical Specification Group Radio Access Network; Study on Small Cell enhancements for E-UTRA and E-UTRAN; Higher layer aspects (Release 12)", December, 2013

Patent Literature

[Patent Literature 1] U.S. Pat. No. 7,443,821

SUMMARY OF INVENTION

Technical Problem

In the aforementioned background art, it is assumed that the base station (eNB) determines whether to allow the UE to perform communication in the cell (the Cell #2) on the unlicensed frequency based on terminal measurement report by the UE (measurement report by UE). For example, the eNB transmits to the UE in the cell on the licensed frequency (the Cell #1) an instruction for sending terminal measurement report, and the UE executes terminal measurement in the cell on the unlicensed frequency (the Cell #2 or the like) and reports, through the Cell #1, the result of the terminal measurement. The eNB determines whether it is appropriate to transmit user data to the UE in the Cell #2 based on the result of the terminal measurement in the Cell #2. The eNB may determine, for example, whether the reception quality (RSRP or RSRQ) of a reference signal (RS) in the cell (the Cell #2 or the like) on the unlicensed frequency is equal to or larger than a predetermined value. When the eNB determines that the Cell #2 is appropriate for user data transmission, the eNB transmits user data to the UE (e.g., the UE #1 in Background Art) in the Cell #2.

However, if the terminal measurement report of normal LTE is used, there is a possibility that an appropriate UE is sometimes not allowed to perform communication (in a cell) on the unlicensed frequency. This is because, since the unlicensed frequency is shared with other communication systems as described above, the reference signal is not always transmitted, unlike in a cell of LTE. For example, the UE might calculate a value for the terminal measurement report by averaging reception quality during the period in which a reference signal is transmitted from another radio system and reception quality during the period in which the reference signal is not transmitted (in this case, the resulting value becomes an invalid value). Then the reception quality on the unlicensed frequency indicated in the terminal measurement report might be calculated to be lower than a threshold level that is defined to determine that it is appropriate to perform communication (in a cell) on the unlicensed frequency. In this case, even when it is determined that the unlicensed frequency is available based on the aforementioned sensing by the eNB (S905 in FIG. 15), unless an appropriate UE is allowed to use the unlicensed frequency, it may be impossible to provide sufficient improvement of performance (e.g., improvement of the throughput or increase in the cell capacity) by the use of the unlicensed frequency.

Accordingly, an object to be attained by embodiments disclosed herein is to provide an apparatus, a method, and a program that contribute to acquisition of information useful for a radio station (e.g., an eNB) to accurately determine whether to allow a radio terminal (e.g., a UE) to perform communication (in a cell) on an unlicensed frequency.

Solution to Problem

In a first aspect, a method performed in a radio station includes: (a) communicating with a radio terminal on a licensed frequency; (b) transmitting, to the radio terminal on the licensed frequency, control signaling associated with at least one of a measurement timing and a measurement period of terminal measurement on an unlicensed frequency: and (c) receiving, from the radio terminal on the licensed frequency, a result of the terminal measurement executed in accordance with at least one of the measurement timing and the measurement period in response to the control signaling.

In a second aspect, a radio station includes a radio communication unit (a transceiver) and a control unit (a controller). The radio communication unit is configured to communicate on a licensed frequency and an unlicensed frequency. The control unit is configured to: transmit, to the radio terminal on the licensed frequency, control signaling associated with at least one of a measurement timing and a measurement period of terminal measurement on the unlicensed frequency: and receive, from the radio terminal on the licensed frequency, a result of the terminal measurement executed in accordance with at least one of the measurement timing and the measurement period in response to the control signaling.

In a third aspect, a method performed in a radio terminal includes: (a) communicating with a radio station on a licensed frequency; (b) receiving, from the radio station on the licensed frequency, control signaling associated with at least one of a measurement timing and a measurement period of terminal measurement on an unlicensed frequency; (c) executing the terminal measurement in accordance with at least one of the measurement timing and the measurement period in response to the control signaling, and (d) transmitting a result of the terminal measurement to the radio station on the licensed frequency.

In a fourth aspect, a radio terminal includes a radio communication unit (a transceiver) and a control unit (a controller). The radio communication unit is configured to communicate with a radio station on a licensed frequency and an unlicensed frequency. The control unit is configured to: receive, from the radio station on the licensed frequency, control signaling associated with at least one of a measurement timing and a measurement period of terminal measurement on the unlicensed frequency; execute the terminal measurement in accordance with at least one of the measurement timing and the measurement period in response to the control signaling; and transmit a result of the terminal measurement to the radio station on the licensed frequency.

In a fifth aspect, a program includes instructions (software codes) that, when loaded into a computer, causes the computer to perform the method according to the aforementioned first aspect.

In a sixth aspect, a program includes instructions (software codes) that, when loaded into a computer, causes the computer to perform the method according to the aforementioned third aspect.

In a seventh aspect, a method for terminal measurement includes: (a) transmitting, from a radio station to a radio terminal on a licensed frequency, control signaling associated with at least one of a measurement timing and a measurement period of terminal measurement on an unlicensed frequency; (b) executing the terminal measurement by the radio terminal in accordance with at least one of the measurement timing and the measurement period in response to the control signaling; and (c) transmitting a result of the terminal measurement from the radio terminal to the radio station on the licensed frequency.

Advantageous Effects of Invention

According to the aforementioned aspects, it is possible to provide an apparatus, a method, and a program that contribute to acquisition of information useful for a radio station (e.g., an eNB) to determine whether to allow a radio terminal (e.g., a UE) to perform communication (in a cell) on the unlicensed frequency.

DESCRIPTION OF EMBODIMENTS

Figure 1A:
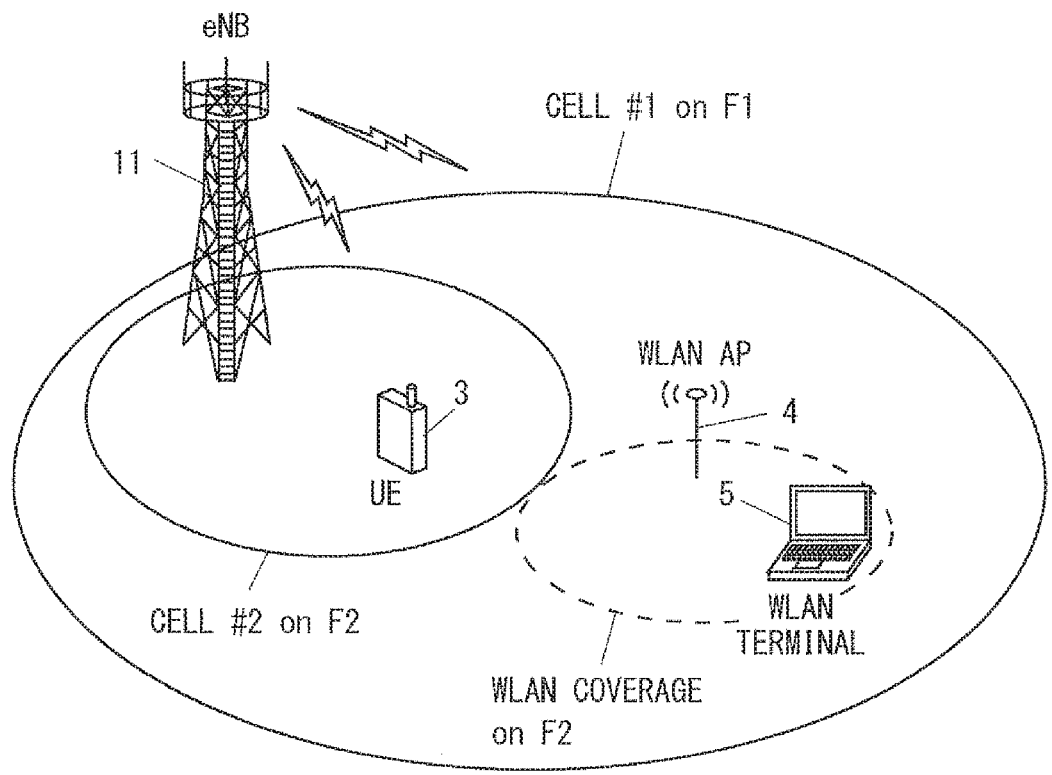
FIG. 1A is a diagram showing a configuration example of a radio communication system and another radio system according to several embodiments.

Specific embodiments are explained hereinafter in detail with reference to the drawings. In the drawings, the same or corresponding elements are denoted by the same reference signs, and repetitive descriptions will be avoided as necessary for clarity of explanation.

Embodiments described below will be explained mainly using specific examples with regard to an Evolved Packet System (EPS) that contains LTE and System Architecture Evolution (SAE). However, these embodiments are not limited to being applied to the EPS and may also be applied to other mobile communication networks or systems such as a 3GPP Universal Mobile Telecommunications System (UMTS), a 3GPP2 CDMA2000 system (1×RTT, HRPD (High Rate Packet Data)), a global system for mobile communications (GSM (registered trademark))/General packet radio service (GPRS) system, and a WiMAX system.

First Embodiment

First, some examples of Unlicensed LTE using an unlicensed frequency (Unlicensed frequency band, Unlicensed spectrum) according to a plurality of embodiments including this embodiment will be described. The Unlicensed LTE is also referred to as LTE-U or U-LTE and is hereinafter referred to as LTE-U. The unlicensed frequency includes a frequency that is used for, for example, radar systems and wireless LAN (WLAN or also referred to as WiFi) and includes frequencies other than licensed frequencies allocated only to any specific operators (i.e., service providers). The unlicensed frequency is, for example, but not limited to, 5 GHz band. Further, the plurality of embodiments described below can also be applied to a shared frequency (Shared frequency band, Shared spectrum) commonly allocated to a plurality of operators. In the following description, frequencies other than licensed frequencies are collectively referred to as the unlicensed frequency.

Figure 1B:
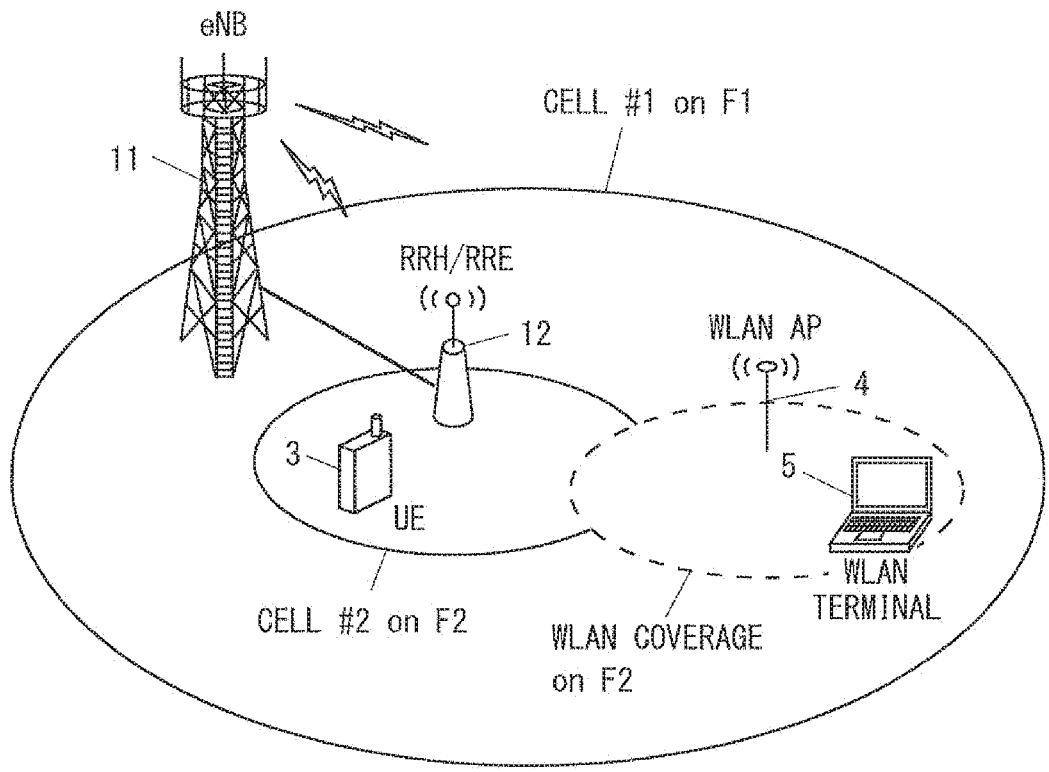
FIG. 1B is a diagram showing a configuration example of the radio communication system and the other radio system according to several embodiments.
Figure 2:
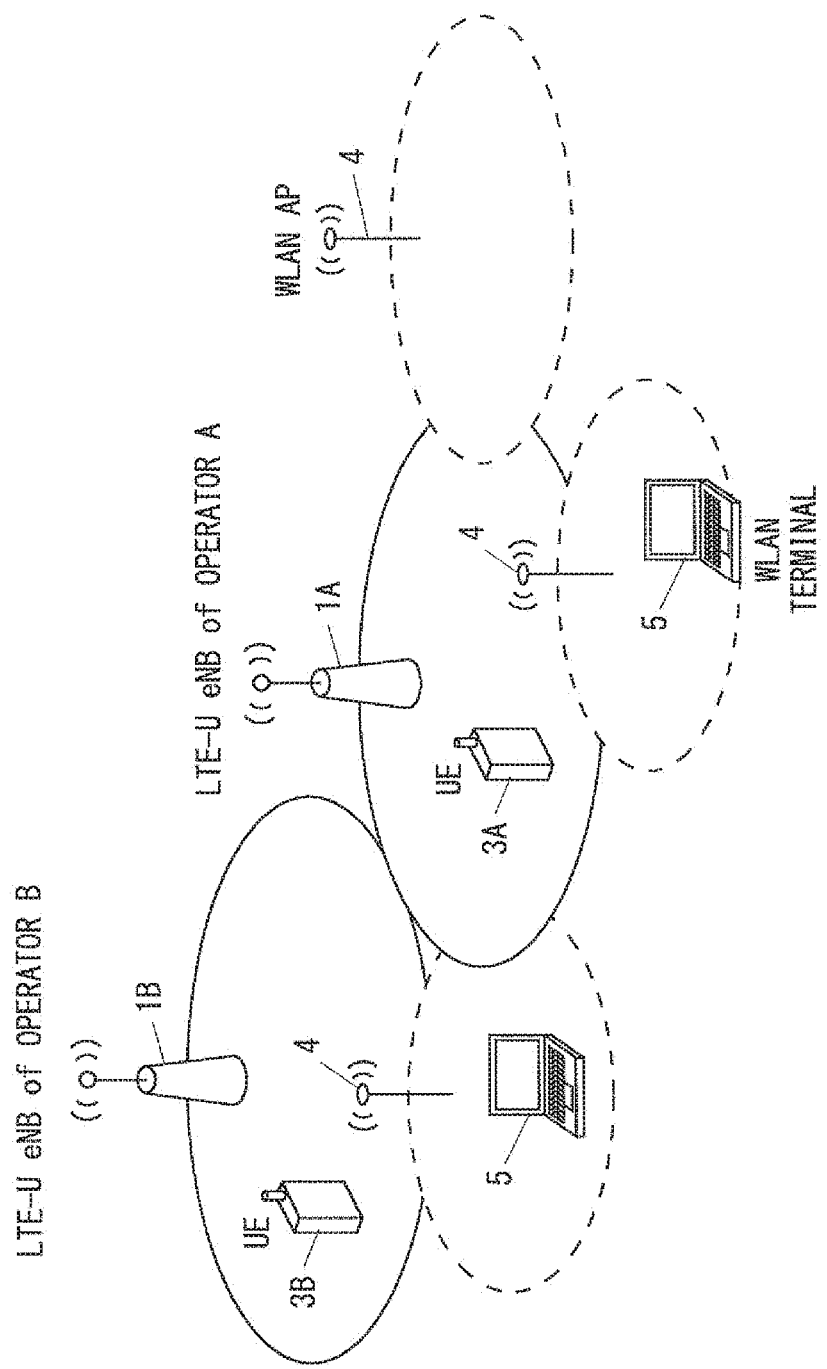
FIG. 2 is a diagram showing a configuration example of the radio communication system and the other radio system according to several embodiments.

FIGS. 1A, 1B, and 2 are diagrams each showing a configuration example of a radio communication system of LTE-U and another system according to the plurality of embodiments including this embodiment. In the example shown in FIG. 1A, the radio communication system includes a radio base station of LTE (eNB) 11 and a radio terminal (UE) 3. The eNB 11 and the UE 3 are configured to perform communication according to normal LTE on a licensed frequency (F1) and to perform communication according to LTE-U on an unlicensed frequency (F2). On the other hand, the unlicensed frequency (F2) is used for communication between a wireless LAN access point (WLAN AP) 4 and a wireless LAN terminal (WLAN Terminal) 5 as well. Besides the example shown in FIG. 1A, in the example shown in FIG. 1B, the LTE eNB 11 manages a remote base station 12

(RRH or RRE) and uses the remote base station 12 to perform communication according to LTE-U on the unlicensed frequency (F2).

The configuration shown in FIG. 1A and that shown in FIG. 1B may coexist in the same system. Further, FIGS. 1A and 1B show only a part of the radio communication system that is considered in this example. In reality, there are a plurality of eNBs and their RRHs/RREs and a plurality of UEs around the eNB 11, the RRH/RRE 12, and the UE 3, and a plurality of cells on the licensed frequency are managed by these eNBs and RRHs/RREs. Further, there may be a plurality of WLAN APs and a plurality of WLAN Terminals around the eNB 11, the RRH/RRE 12, and the UE 3. In the following description, the term "radio base station 1" or "LTE-U eNB 1" is used to indicate any eNB having the function of LTE-U. That is, the radio base station 1 or the LTE-U eNB 1 corresponds to the eNB 11 in the configuration shown in FIG. 1A and corresponds to the eNB 11 and the RRH/RRE 12 in the configuration shown in FIG. 1B. For the sake of convenience of explanation, only a node corresponding to the RRH/RRE 12 *n* the configuration shown in FIG. 1B may be referred to as the radio base station 1 or the LTE-U eNB 1.

FIG. 2 is a configuration example of the radio communication system of LTE-U and another radio communication system when the unlicensed frequency is particularly noted. There are a radio base station (LTE-U eNB-A) 1A having the function of LTE-U of one operator (service provider) A and a radio terminal (UE for Operator A: UE-A) 3A capable of being connected to a network of the operator A. There also are a radio base station (LTE-U eNB-B) 1B having the function of LTE-U of another operator (service provider) B and a radio terminal (UE for Operator B: UE-B) 3A capable of being connected to a network of the operator B. Each of the LTE-U eNBs 1A and 1B corresponds to, for example, the eNB 11 and the RRH/RRE 12 in FIGS. 1A and 1B and is also referred to as an LTE-U AP, which means an access point of LTE-U. Further, similar to FIGS. 1A and 1B, there are WLAN APs 4 and WLAN Terminals 5 around the LTE-U eNBs 1A and 1B and the UEs 3A and 3B.

In the aforementioned description and the following description, it is assumed that LTE-U is implemented using LAA (also referred to as LA-LTE). As already stated above, in LAA, the radio base station (LTE-U eNB) 1 and the radio terminal (UE) 3 perform carrier aggregation (CA) of a cell on the licensed frequency and a cell on the unlicensed frequency, use the cell on the licensed frequency as a primary cell (PCell), and use the cell on the unlicensed frequency as a secondary cell (SCell). As already stated above. LTE-U may be executed using a shared frequency (Shared frequency band, Shared spectrum) allocated to a plurality of operators (service providers) instead of using the unlicensed frequency. In this case, LTE-U may be achieved by the aforementioned LAA or a scheme similar to LAA. Alternatively, the LTE-U eNB 1 and the UE 3 may perform CA using a plurality of shared frequencies (e.g., two frequencies F3 and F4), and execute normal LTE in a PCell on one of two shared frequencies (F3) and execute LTE-U in a SCell on the other shared frequency (F4). As already stated above, LTE-U using a shared frequency is specifically referred to as Licensed Shared Access (LSA). Furthermore, the LTE-U eNB 1 and the UE 3 may perform CA using a shared frequency allocated to a plurality of operators (e.g., F3) and an unlicensed frequency in a narrow sense that is not allocated to any operator (e.g., F2 (e.g., 5 GHz band)), and execute normal LTE in a PCell on the shared frequency (F3) and execute LTE-U in a SCell on the unlicensed frequency in a narrow sense (F2).

Further, in the plurality of embodiments including this embodiment, it is assumed that communication on the unlicensed frequency (or the shared frequency) executed in LTE-U is basically downlink data transmission from the radio base station 1 to the radio terminal 3 in order to simplify explanation. Needless to say, however, communication on the unlicensed frequency (or the shared frequency) according to LTE-U can be applied also to uplink data transmission from the radio terminal 3 to the radio base station 1. Further, when the communication between the radio base station 1 and the radio terminal 3 on the unlicensed frequency can be performed only in the downlink, in LAA using the unlicensed frequency as the secondary cell (SCell), the unlicensed frequency does not substantially serve as a separate cell and only serves as a downlink secondary carrier (Secondary Component Carrier: SCC). In the plurality of embodiments including this embodiment, however, explanation will be basically given without considering whether the unlicensed frequency serves as a separate cell on its own and a supplementary explanation will be given as necessary.

Figure 3:
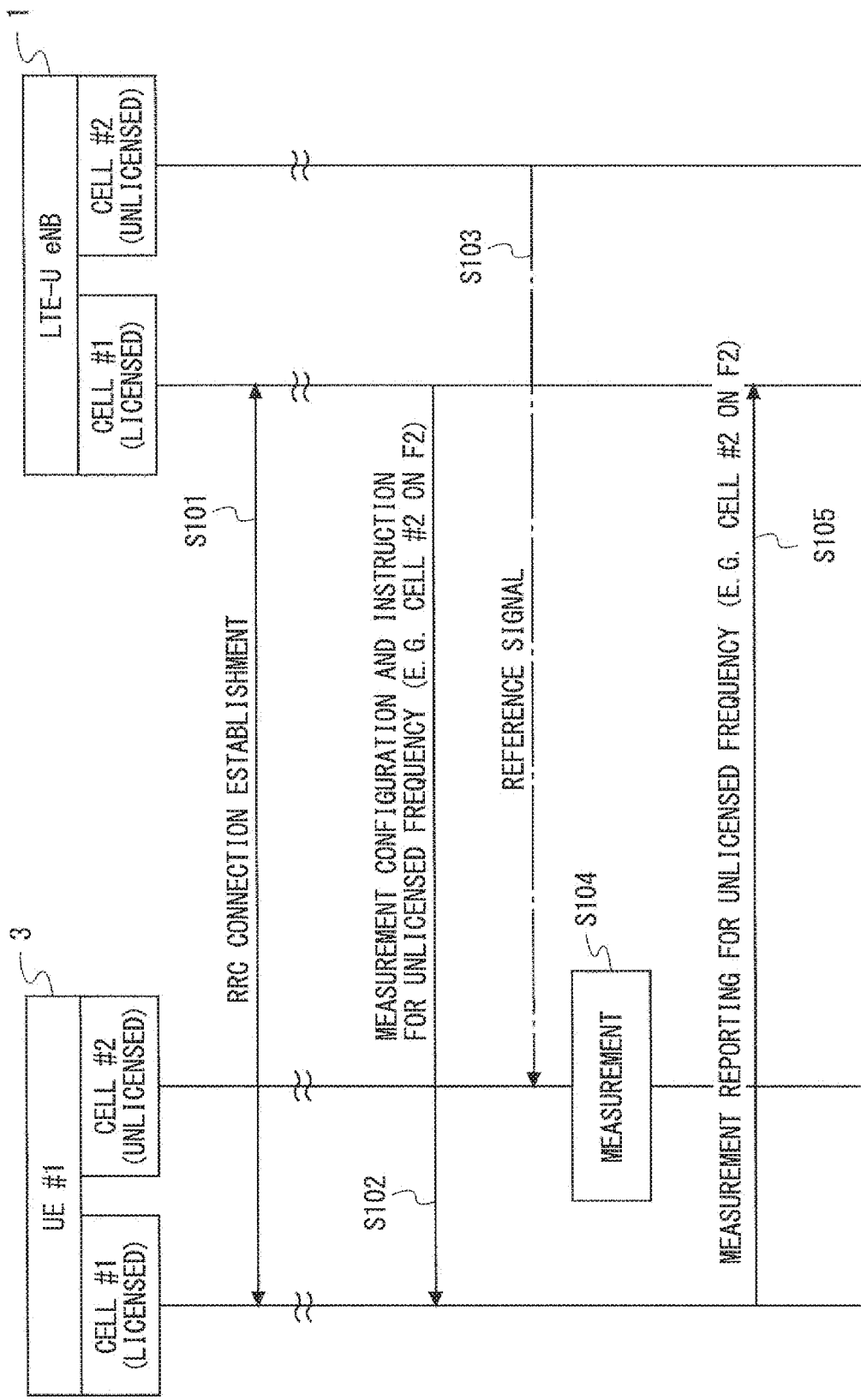
FIG. 3 is a sequence diagram showing one example of operations of a radio base station and a radio terminal according to a first embodiment.

FIG. 3 is a sequence diagram showing operations of the radio base station (LTE-U eNB) 1 and the radio terminal (UE) 3 according to the first embodiment. The radio terminal 3 is denoted as "UE #1" in FIG. 3. In FIG. 3, it is assumed that the LTE-U eNB 1 manages a cell (Cell #1) on the licensed frequency (F1) and a cell (Cell #2) on the unlicensed frequency (F2).

In FIG. 3, the UE 3 first establishes a radio connection with the LTE-U eNB 1 in the Cell #1 (RRC Connection Establishment, S101) and further establishes a bearer (e.g., EPS bearer, E-RAB) with a core network (EPC) (not shown). Then, the UE 3 enters a state in which, for example, the UE 3 can transmit and receive user data (not shown). The LTE-U eNB 1 instructs the UE 3 to perform terminal measurement (UE measurement) on the unlicensed frequency (e.g., F2), by means of a predetermined control signaling in the Cell #1 (Measurement Configuration and Instruction for Unlicensed Frequency (e.g., Cell #2 on F2), S102). In other words, the predetermined control signaling transmitted in the Cell #1 explicitly or implicitly indicates an instruction for the terminal measurement (UE measurement) on the unlicensed frequency (e.g., F2).

The control signaling or the instruction for the terminal measurement (S102) is associated with at least one of: a measurement timing indicating a timing when the UE 3 should perform the terminal measurement on the unlicensed frequency (e.g., the Cell #2 of F2) (i.e., a timing when the UE 3 shall perform the terminal measurement); and a measurement period indicating a period in which the UE 3 should perform the terminal measurement (i.e., an appropriate period in which the terminal measurement is executed). In other words, the control signaling or the instruction for the terminal measurement (S102) explicitly or implicitly indicates at least one of the measurement timing and the measurement period (measurable period) of the terminal measurement to be performed by the UE 3 on the unlicensed frequency (e.g., the Cell #2 of F2). For example, the instruction for the terminal measurement may explicitly indicate at least one of the measurement timing and the measurement period or may include information regarding at least one of the measurement timing and the measurement period. Further, the instruction for the terminal measurement may include information regarding one or both of the unlicensed frequency and the cell on the unlicensed frequency, on which the terminal measurement is to be performed. Further, the number of unlicensed frequencies on which the terminal measurement is to be performed may be one, as shown in FIG. 3, or may be two or more. In a similar way, the number of cells on the unlicensed frequency(ies) may be one or may be two or more. Configuration information for the terminal measurement (Measurement Configuration: MeasConfig) and the instruction for the terminal measurement (Measurement Instruction) may be transmitted by the same control signaling or may be transmitted by different control signalings (or by a control message and control signaling).

The configuration information for the terminal measurement (MeasConfig) includes, for example, at least one of: information regarding one or more unlicensed frequencies on which the terminal measurement to be performed; and information regarding cell(s) on these unlicensed frequency(ies). The information regarding the unlicensed frequency(ies) may include, for example, one or any combination of the following elements:

a frequency identifier of LTE (e.g., E-UTRA Absolute Radio Frequency Channel Number (EARFCN)):

an unlicensed frequency identifier (e.g., an Unlicensed frequency index); and a (center) frequency (e.g., a carrier frequency).

The unlicensed frequency identifier may be defined as a number or an index newly added to an unlicensed frequency that is available for LTE-U.

The information regarding the cell(s) on an unlicensed frequency(ies) may include, for example, one or any combination of the following elements:

a cell identifier (e.g., a Physical Cell Identifier (PCI), an EUTRAN Cell Global ID (ECGI), or a Virtual Cell ID); and an unlicensed frequency cell identifier (e.g., an Unlicensed Cell ID).

The Virtual Cell ID may be, for example, a scrambling code identifier (e.g., a Scrambling Identity or a Scrambling Code ID) used to transmit a reference signal or another signal in the cell on the unlicensed frequency. The unlicensed frequency cell identifier may be defined as a cell number or a cell index newly added to a cell on an unlicensed frequency.

Further, MeasConfig may include another network identifier (e.g., a Public Land Mobile Network Identifier (PLMN ID), a Tracking Area Identity (TAI), or a Tracking Area Code (TAC)). When MeasConfig includes these network identifiers, the radio terminal 3 may perform the terminal measurement in a cell in response to detecting the specified network identifier in this cell.

Furthermore, MeasConfig may include information regarding other system(s) on the unlicensed frequency on which the terminal measurement is to be performed. The information regarding other system(s) may be, for example, a WLAN (Access Point) identifier (e.g., a Service Set Identifier (SSID), a Basic SSID (BSSID), or a Homogenous Extended SSID (HESSID)). When MeasConfig includes the WLAN identifier, the radio terminal 3 may measure reception quality (e.g., a Received Signal Strength Indicator (RSSI), a Received Channel Power Indicator (RCPI) or a Received Signal to Noise Indicator (RSNI)) of a signal from the WLAN in response detecting the specified WLAN identifier on the unlicensed frequency on which the terminal measurement is to be performed, and report the measured reception quality to the radio base station 1.

With reference once again to FIG. 3, the explanation will be continued. The UE 3 performs the terminal measurement in the Cell #2 in response to the control signaling (S102), that is, in accordance with the instruction for the terminal measurement (Measurement, S104) and reports the result of the terminal measurement to the LTE-U eNB in the Cell #1 (Measurement Reporting for Unlicensed Frequency (e.g., Cell #2 on F2), S105). In the terminal measurement (S104), the UE 3 may measure, for example, reception intensity or reception quality of a reference signal (S103) transmitted from the LTE-U eNB 1 in the Cell #2. The terminal measurement and the terminal measurement report may be performed not only in the cell (Cell #2) on the unlicensed frequency (F2) but also in other cell(s) on F2, in other unlicensed frequency(ies), or in the licensed frequency. The instruction for the terminal measurement may be explicitly transmitted, or the transmission of the aforementioned information regarding the terminal measurement timing or the measurement period may be an implicit instruction for performing the terminal measurement.

As described above, the radio base station (LTE-U eNB) 1 notifies or instructs the radio terminal (UE) 3 of one or both of the measurement timing and the measurement period of the terminal measurement on the unlicensed frequency and, the fore, can collect a desired result of the terminal measurement. The LTE-U eNB 1 also can determine whether it is possible (or appropriate) to communicate with the UE 3 (i.e., perform data transmission/reception by LTE) (in a cell) on the unlicensed frequency based on the result of the terminal measurement.

However, the radio base station (LTE-U eNB) 1 is not always able to operate LTE (in a cell) on the unlicensed frequency. The LTE-U eNB 1 may check whether the unlicensed frequency is available for LTE-U by sensing or the like and, for example, transmit a synchronization signal and a reference signal when the unlicensed frequency is available for LTE-U. Therefore, the LTE-U eNB 1 may adjust the transmission timing of the control signaling or adjust control information carried by the control signaling, which indicates at least one of the measurement timing and the measurement period, in such a way that the measurement timing or the measurement period of the terminal measurement on the unlicensed frequency is within the period in which the LTE-U eNB 1 can use the unlicensed frequency (i.e., availability period). In one example, the LTE-U eNB 1 may specify one or both of the measurement timing and the measurement period in such a way that they are within the period in which the unlicensed frequency is determined to be available. Further, when it is determined that the unlicensed frequency is available or while the unlicensed frequency is available, the LTE-U eNB 1 may transmit the instruction for the terminal measurement on the unlicensed frequency by the predetermined control signaling. As already stated above, the aforementioned sensing by the LTE-U eNB 1 is also referred to as Listen Before Talk (LBT). This sensing corresponds, for example, to CAC for radar systems or CCA executed by a WLAN AP. The CAC is not required to be executed when the unlicensed frequency to be measured is not a frequency used in radar systems.

Specific Example 1

Figure 4:
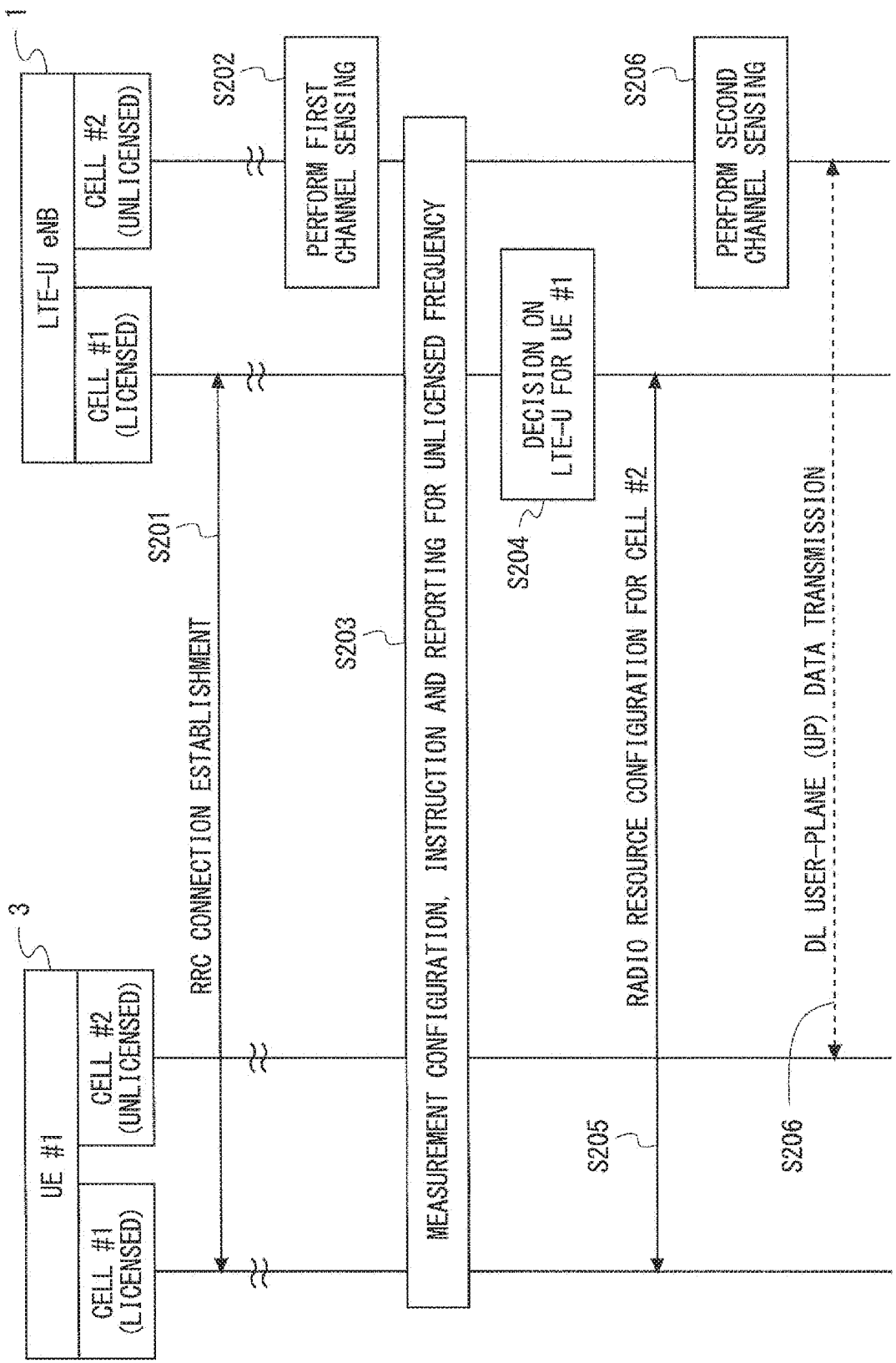
FIG. 4 is a sequence diagram showing one example of operations of the radio base station and the radio terminal according to the first embodiment (specific example 1)

A specific example 1 according to the first embodiment will be described. FIG. 4 is a sequence diagram showing operations of the radio base station (LTE-U eNB) 1 and the radio terminal 3 in the specific example 1. The case assumed in FIG. 4 is similar to that assumed in FIG. 3: the radio base station (LTE-U eNB) 1 manages a cell (Cell #1) on the licensed frequency (F1) and a cell (Cell #2) on the unlicensed frequency (F2). The LTE-U eNB 1 instructs the UE 3 to perform terminal measurement on the unlicensed frequency (F2) and determines whether to perform communication with the UE 3 according to LTE-U on the unlicensed frequency (e.g., downlink data transmission) based on the result of the terminal measurement. The radio terminal 3 is denoted as "UE #1" in FIG. 4.

In FIG. 4, the UE 3 first establishes a radio connection with the LTE-U eNB 1 in the Cell #1 (RRC Connection Establishment, S201) and further establishes a bearer (e.g., EPS bearer, E-RAB) with a core network (EPC) (not shown). Then, the UE 3 enters a state in which, for example, the UE 3 can transmit and receive user data (not shown). The LTE-U eNB 1 performs first sensing on the unlicensed frequency (F2) (Perform first channel sensing. S202). The first sensing includes CAC for radar systems, CCA for other systems such as WLAN, CCA for LTE-U served by other operators (service providers), or two of them, or all of them. Upon determining that the unlicensed frequency (F2) is available by the first sensing (S202), the LTE-U eNB 1 instructs the UE 3 to perform the terminal measurement (in the cell (Cell #2)) on F2 by a predetermined control signaling, and then the UE 3 performs the terminal measurement in accordance with the instruction and reports the result of the terminal measurement to the LTE-U eNB 1 (Measurement Configuration, Instruction and Reporting for Unlicensed Frequency, S203). The LTE-U eNB 1 determines whether to perform communication (e.g., downlink data transmission) with the UE 3 in the Cell #2 based on the result of the terminal measurement that has been reported (S204).

The terminal measurement may include, for example, measurement of reception quality of a reference signal (RS) (e.g., Reference Signal Received Power (RSRP), Reference Signal Received Quality (RSRQ), an RSSI, a Channel Quality Indicator (CQI), or a Signal-to-Interference-plus-Noise ratio (SINR)). The determination made by the LTE-U eNB 1 may be performed based on whether the value of the reception quality that has been reported is equal to or larger than a predetermined value (or larger than the predetermined value). The reference signal is a generic name for signals whose types and sequences or candidates thereof are known in advance in the radio terminal 3 and is also referred to as a pilot signal. The reference signal in LTE includes, for example, a Cell Specific Reference Signal (CRS) that is different per cell, a Channel State Information (CSI) RS that is used also for a CQI measurement, or a discovery reference signal (DRS) that is used for cell detection.

Further or alternatively, the terminal measurement may include measurement of reception quality (RSSI, RCPI, or RSNI) of a predetermined signal defined in other systems such as WLAN (e.g., a reference signal or some or all of the signals transmitted in the frequency of this system). In this case, the determination made by the LTE-U eNB 1 may be performed based on whether the value of the reception quality that has been reported is equal to or smaller than a predetermined value (or smaller than the predetermined value). Alternatively, the UE 3 may perform detection (i.e., attempt to perform detection) of signals of another system such as WLAN by the terminal measurement and report the result of the detection. In this case, the determination made by the LTE-U eNB 1 may be performed based on whether the LTE-U eNB 1 receives the report indicating that other system(s) has been detected.

Further or alternatively, the UE 3 may acquire load information (Basic Service Set (BSS) Load) on other system(s) such as WLAN in the terminal measurement and report the load information. In this case, the determination made by the LTE-U eNB 1 may be performed based on whether the load of the other system(s) is equal to or larger than a predetermined threshold (or larger than the threshold). The LTE-U eNB 1 may determine whether to perform communication with the UE 3 in the Cell #2 based on the aforementioned plurality of results of the terminal measurement.

When the LTE-U eNB 1 determines to perform communication with the UE 3 in the Cell #2, the LTE-U eNB 1 transmits, to the UE 3 in the Cell #1, radio resource configuration information regarding the Cell #2 (e.g., RadioResourceConfigCommon and RadioResourceConfigDedicated) (Radio Resource Configuration for Cell #2, S205). In this case, the LTE-U eNB 1 may use, for example, an RRC Connection Reconfiguration message.

The LTE-U eNB 1 then performs second sensing on the unlicensed frequency (F2) (Perform second channel sensing, S206). The second sensing may be the same as, or different from, the first sensing. When the LTE-U eNB 1 determines that the unlicensed frequency (F2) is available, the LTE-U eNB 1 transmits user data (UP data) to the UE 3 in the Cell #2 (S207). In this case, scheduling of the user data (i.e., transmission of information regarding allocation of radio resources) may be performed in a cell (e.g., the Cell #1) on the licensed frequency (e.g., F1) or in the Cell #2. The former scheduling may use the technique referred to as cross-carrier scheduling in LTE. Alternatively, the user data transmission to the UE 3 in the Cell #2 may be performed based on CSI feedback information (e.g., CQI, Precoding Matrix Indicator (PMI), Rank Indicator (RI)) regarding the Cell #2 reported from the UE 3 in the Cell #1.

Using the aforementioned procedure, the radio base station (LTE-U eNB) 1 is able to appropriately determine the radio terminal (UE) 3 that is allowed to perform LTE (LTE-U) on the unlicensed frequency. As a result, it can be expected to improve performance (e.g., system throughput) of the whole LTE radio communication system.

Specific Example 2

A specific example 2 according to the first embodiment will be described. The difference from the specific example is that the radio base station (LTE-U eNB) 1 uses control signaling that is generated using control information defined for instructing the terminal measurement on the unlicensed frequency. The control information may be explicitly contained in the control signaling, or the control information may be used for data scrambling in the process of generating the control signaling. In the specific example 2, a Layer 1 (L1) control signal or a Layer 2 (L2) control signal or both (L1/L2 signaling) transmitted in a physical downlink control channel (PDCCH) is used as the control signaling to transmit the instruction for the terminal measurement on the unlicensed frequency (F2). The control information is a U-RNTI (an LTE-U RNTI, a U-LTE RNTI, or an Unlicensed RNTI), which is one of the identifiers (Radio Network Temporary Identifier: RNTI) used for generation and detection of the PDCCH. The U-RNTI may be set to a common value for a plurality of radio terminals 3 that are in the radio connected state (RRC_CONNECTED) in a cell on the licensed frequency (e.g., F1) (i.e., radio terminals having the capability of communicating on the unlicensed frequency).

That is, the control signaling (L1/L2 control signal) that transmits the instruction for the terminal measurement on the unlicensed frequency (F2) is transmitted using the U-RNTI (i.e., its Cyclic Redundancy Check (CRC) part is scrambled by the U-RNTI). In one example a new PDCCH format (a Downlink Control Information (DCI) format) may be defined for the instruction for the terminal measurement on the unlicensed frequency. Alternatively, a new physical control channel named "LTE-U PDCCH (U-PDCCH)" may be defined, and this U-PDCCH may be used for transmission of the L1/L2 control signal in place of the PDCCH. The U-PDCCH may be defined, for example, to use a part of the resources for a physical downlink shared data channel (PDSCH).

In the specific example 2, the reception of the control signaling by the radio terminal (UE 3) implicitly indicates the measurement timing. That is, when the radio terminal (UE) 3 receives the control signaling, the radio terminal (UE) 3 recognizes that it has received an instruction for performing the terminal measurement in the cell (Cell #2) on the unlicensed frequency (F2). In order to achieve this process, the radio base station (LTE-U eNB) 1 may send the configuration information (e.g., Measurement Configuration: MeasConfig), which is necessary for the terminal measurement in the cell (Cell #2) on the unlicensed frequency (F2), to the radio terminal (UE) 3 in the cell (Cell #1) on the licensed frequency (F1) in advance by using an RRC signaling.

MeasConfig includes, for example, at least one of: information regarding one or more unlicensed frequencies (F2) to be measured (e.g., EARFCN, Unlicensed frequency index, or carrier frequency); and information regarding a cell(s) (Cell #2) on the unlicensed frequency (F2) (e.g., PCI, ECGI, Virtual Cell ID, Unlicensed Cell ID). Furthermore, the radio base station (LTE-U eNB) 1 may notify, using MeasConfig or another RRC information element (IE), the radio terminal (UE) of information regarding a period allowed for allocation of the unlicensed frequency to LTE-U. The information regarding the period allowed for allocation may include one or both a Duty Cycle Period (e.g., in millisecond (ms)) and a Duty Cycle (e.g., in percent (%)). The Duty Cycle Period is the reference period to define the period allowed for allocation. The Duty Cycle indicates the rate of the period allowed for allocation in the reference period. When the Duty Cycle Period is 200 ms and the Duty Cycle is 50%, for example, it may be considered that the period allowed for allocation to LTE-U of 100 ms is provided for every 200 ms. The values of the Duty Cycle Period and the Duty Cycle may be defined, for example, in advance in the specification, or may be sent from a control apparatus (e.g., a Mobility Management Entity (MME), or an Operation, Administration and Maintenance (OAM) entity) to the radio base station 1. Otherwise, the radio base station 1 itself may determine the Duty Cycle Period and the Duty Cycle as appropriate based on the result of sensing or the like.

Figure 5:
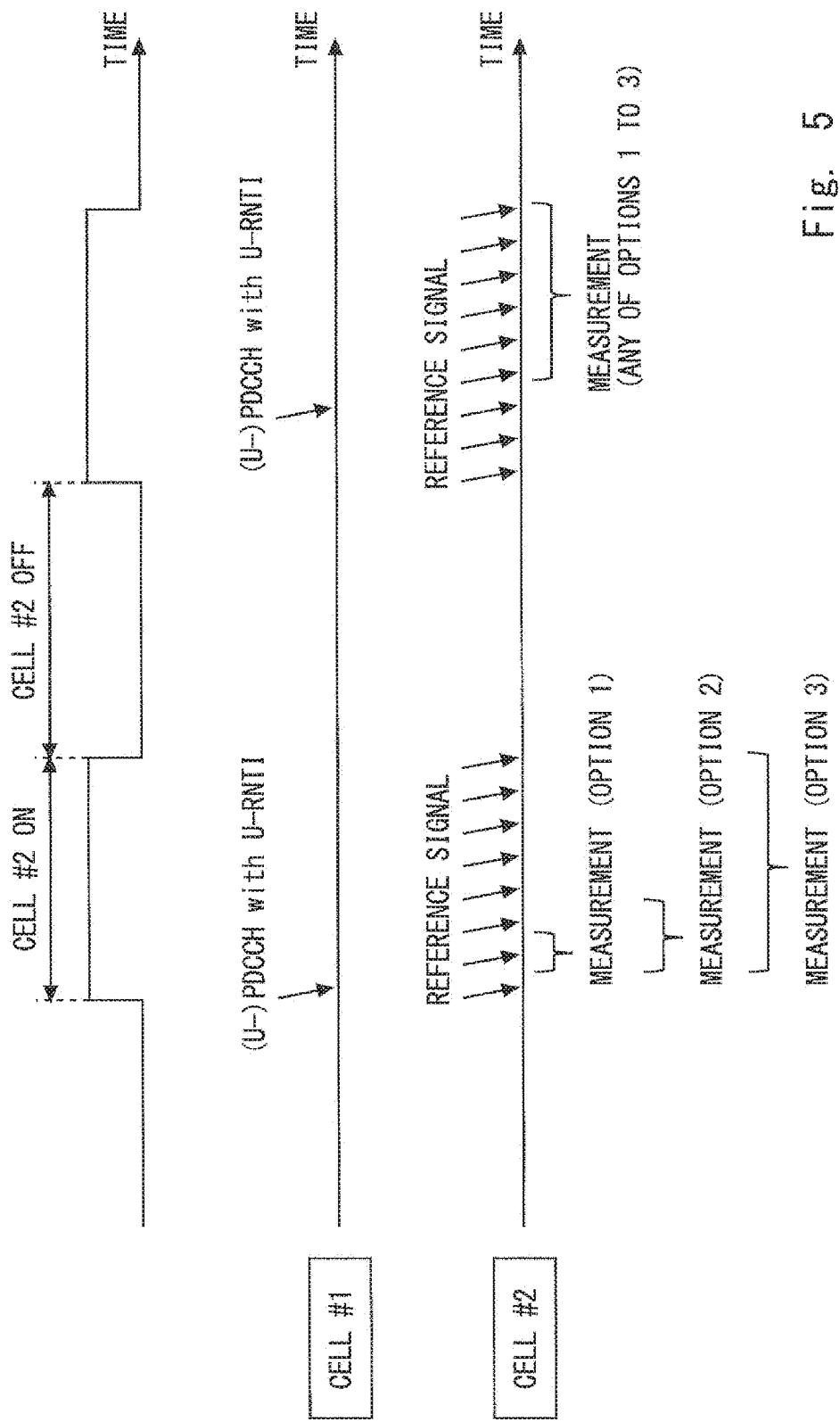
FIG. 5 is a diagram showing one example of terminal measurement by the radio terminal according to the first embodiment (specific example 2)

FIG. 5 is a diagram for describing the terminal measurement performed by the radio terminal (UE) 3 in the cell (Cell #2) on the unlicensed frequency (F2) according to the specific example 2. In this example, the radio base station (LTE-U eNB) 1 dynamically switches the operation state of the Cell #2 based on, for example, the result of sensing for other systems. For example, the LTE-U eNB 1 intermittently transmits a predetermined reference signal (RS) on F2 so as to switch the Cell #2 On (i.e., in operation) and Off (i.e., not in operation). The period in which the predetermined reference signal (RS) is being transmitted on F2 corresponds to the On (in operation) period in the Cell #2.

When the LTE-U eNB 1 determines that the Cell #2 should be switched on, the LTE-U eNB 1 transmits the control signaling (L1/L2 control signal), which is transmitted by (U-)PDCCH using the aforementioned U-RNTI, in the cell (e.g., the Cell #1) on the licensed frequency to instruct the UE 3 to perform the terminal measurement in the Cell #2. Upon receiving the control signaling, the UE 3 performs the terminal measurement in the Cell #2.

There are three methods shown in FIG. 5, for example, as a method of the terminal measurement in the Cell #2. In the first method (option 1), after receiving the (U-)PDCCH, the UE3 performs the terminal measurement for a predetermined RS in the Cell #2 only once. In this method, the UE 3 performs the terminal measurement only once just after receiving the (U-)PDCCH (e.g., after several ms) and the UE 3 can immediately send the terminal measurement report, whereby it is possible to immediately use the Cell #2 (if a criterion for communicating in the Cell #2 is satisfied).

In the second method (option 2), after receiving the (U-)PDCCH, the UE 3 performs the terminal measurement for a predetermined RS in the Cell #2 a plurality of times. For example, the UE 3 may perform a primary terminal measurement (i.e., L1 measurement in this example) of two or more measurements (i.e., two or more measurement samples), which is a requirement for the terminal measurement used for cell (re)selection or the like in LTE, and perform averaging process (i.e., L3 filtering) on the results of the primary terminal measurement (secondary terminal measurement). This method is advantageous over the first method in that reliability (accuracy) of the result of the terminal measurement increases. However, according to the requirements for the terminal measurement used for the cell (re)selection or the like, it is required to perform two measurements in about 200 ms. Thus, time restrictions are relatively loose. Therefore, when this terminal easement is reused for LTE-U, it is preferable that the requirements for the period in which the primary terminal measurement (L1 measurement) of two (or more) measurements is performed be defined to be, for example, within about 10 milliseconds or within several tens of milliseconds. The term "terminal measurement" means, but not limited to, both the primary terminal measurement and the secondary terminal measurement mentioned above (i.e., both the primary terminal measurement and the secondary terminal measurement is performed).

In the third method (option 3), after receiving the (U-)PDCCH, the UE 3 starts and continues the terminal measurement during a period in which the UE 3 can be detecting a predetermined signal (i.e., a Synchronization signal (RS) and a Master Information Block (MIB)) transmitted in the Cell #2, and the UE 3 suspends (or stops) the terminal measurement when the UE 3 cannot detect the predetermined signal any more. Here, the "period in which the UE 3 can be detecting the predetermined signal" can also be referred to as a "period in which the UE 3 can be detecting the Cell #2". The period in which the UE 3 can be detecting the predetermined signal may be, for example, a period during which reception quality (e.g., RSRP) of a predetermined RS (e.g., CRS) is equal to or larger than a predetermined threshold (e.g., −110 dBm). One advantage of this method is that reliability (accuracy) of the result of the terminal measurement further increases compared to that of the second method. On the other hand, it is required to set a condition for continuing the terminal measurement (or a condition for suspending the terminal measurement) in the UE 3 in such a manner that the UE 3 does not continue the terminal measurement after the LTE-U eNB 1 suspends the transmission of the predetermined RS in the Cell #2. Alternatively, the maximum number of times or the longest duration period of the terminal measurement may be defined in the specification in advance, or may be sent to the UE 3 from the LTE-U eNB 1.

Furthermore, when the UE 3 has received the information regarding the period allowed for allocation of the unlicensed frequency to LTE-U (e.g., the Duty Cycle Period and the Duty Cycle) in advance, the UE 3 may determine the duration period of the terminal measurement based on this information. When the Duty Cycle Period is specified to be 100 ms and the Duty Cycle is specified to be 40%, for example, 40 ms in a cycle of 100 ms corresponds to the period allowed for allocation. When the UE 3 detects a predetermined signal (e.g., RS) in the Cell #2, the UE 3 may start the terminal measurement for the period of 40 ms at the time (e.g., subframe number (subframe #)) when the predetermined signal is detected. Furthermore, the UE 3 may repeat the same operation in a cycle of 100 ms. That is, the UE 3 may suspend the terminal measurement for the period of 60 ms after the terminal measurement performed in the first 40 ms and resume the terminal measurement during the next 40 ms.

The U-RNTI may be common for all the radio terminals 3 in the cell in which the radio terminal resides (serving cell: e.g., Cell #1 in the specific example 2), may be common for some of the radio terminals 3 (terminal group) in the cell, or may be different for each radio terminal 3.

Further, the LTE-U eNB 1 may transmit (U-)PDCCH when the LTE-U eNB 1 is turning on the cell (e.g., the Cell #2) on the unlicensed frequency (e.g., F2) (i.e., when the LTE-U eNB 1 starts transmitting a predetermined signal (e.g., Synchronization signal (RS) and MIB)), or may transmit (U-)PDCCH at a desired timing during a period in which the cell is in the On state.

Modified Example of Specific Example 2

A modified example of the aforementioned specific example 2 will be described. The difference from the specific example 2 is that the (U-)PDCCH, which is generated by using U-RNTI and indicates the instruction for the terminal measurement in the cell (Cell #2) on the unlicensed frequency (F2), includes the information regarding the measurement period in which the terminal measurement should be performed. That is, upon determining that the Cell #2 should be switched on, the radio base station (LTE-U eNB) 1 transmits the (U-)PDCCH using the U-RNTI in the cell (e.g., Cell #1) on the licensed frequency (e.g., F) to instruct the UE 3 to perform the terminal measurement in the Cell #2. Upon receiving the (U-)PDCCH, the UE 3 starts the terminal measurement in the Cell #2, continues the terminal measurement in the Cell #2 for the measurement period that has been instructed, and reports the result to the LTE-U eNB 1 in the cell (e.g., Cell #1) on the licensed frequency. In this method, the LTE-U eNB can collect appropriate result of the terminal measurement which provides desired reliability (or accuracy).

The information regarding the measurement period includes, for example, the following items:
  a combination of a start timing and an end timing of the terminal measurement;
  an end timing of the terminal measurement;
  a period of the terminal measurement: or
  information regarding the period allowed for allocation of the unlicensed frequency to LTE-U.

As described above, the information regarding the period allowed for allocation may include one or both the Duty Cycle Period (e.g., in millisecond (ms)), which is the reference period to define the period allowed for allocation, and the Duty Cycle (e.g., in percent (%)), which indicates the rate of the period allowed for allocation in the reference period. That is, the Duty Cycle Period and the Duty Cycle can be used to specify the cycle and the length (duration) of the periodic period allowed for allocation.

The method of the terminal measurement in the Cell #2 may vary depending on the information regarding the measurement period. For example, when the information regarding the measurement period indicates the combination of the start timing and the end timing of the terminal measurement the radio terminal 3 may start and end the terminal measurement in accordance with the indicated start timing and end timing. When the information regarding the measurement period indicates the end timing of the terminal measurement, the radio terminal 3 may start the terminal measurement in response to receiving the control signaling (L1/L2 control signal) including the information regarding the measurement period and end the terminal measurement in the indicated end timing. When the information regarding the measurement period indicates the period of the terminal measurement, the radio terminal 3 may continue the terminal measurement from the time the control signaling is received to the time this period expires.

Further, in the aforementioned information regarding the measurement period, the start timing, the end timing, the period of the terminal measurement, and the information regarding the period allowed for allocation may be defined using one or any combination of the following elements:
  a unit time (ms);
  a subframe number (subframe #) or a frame number (SFN):
  the number of subframes or the number of frames;
  a subframe pattern or a frame pattern;
  a subframe offset or a frame offset;
  an absolute time;
  a relative time; and
  a rate (%).

The unit time may be indicated by, for example, us (microsecond) or s (second), instead of ms (millisecond). For example in LTE, the subframe number (subframe #) can be any value 0 (#0) to 9 (#9) and each subframe has a length of 1 ms. The frame number is, for example, a System Frame Number (SFN) in LTE, which can be any value 0 (#0) to 1023 (#1023). Each frame consists of 10 subframes (10 ms). The subframe offset or the frame offset specifies the time point that is deviated from the beginning (i.e., #0) of the subframe or the frame by the offset value, and is effective, for example, for specifying the start timing of the terminal measurement.

The subframe pattern or the frame pattern indicates subframe(s) or frame(s) in which the terminal measurement is performed and may be a bit sequence (bitmap) that represents 10 subframes or 10 frames. For example, in the bit sequence, the bit(s) corresponding to subframe(s) or frame(s) in which the terminal measurement should be performed may be set to 1 (or 0) and the remaining bit(s) may be set to 0 (or 1).

The absolute time is, for example, time information acquired by a Global Navigation Satellite System (GNSS) such as a Global Positioning System (GPS), and may be used to specify one or both the start timing and the end timing of the terminal measurement. The relative time may indicate an elapsed time since the reception of the control signaling including the information regarding the measurement period (subframe) or since the detection (restoration)

of the control signaling, and may be used to specify the period in which the terminal measurement is performed.

The rate is used, for example, to indicate the Duty Cycle included in the information regarding the period allowed for allocation of the unlicensed frequency to LTE-U. That is, the rate can be used to specify the length (duration) of the periodic period allowed for allocation. The rate with respect to the period allowed for allocation may be defined by, for example, a fractional value (0.01, 0.02, . . . , 010, . . . , 0.99, or 1.00), rather than percentage (%). Further, when the maximum value of the Duty Cycle Period is denoted by MaxDutyCycle, the value of the rate (i.e., it corresponds to the Duty Cycle) may be indicated by an integer value (1, 2, . . . , MaxDutyCycle). In this case, the value of the rate substantially indicates the length of the ON period of the Duty Cycle, i.e., the length of the period allowed for allocation of the unlicensed frequency to LTE-U.

They are merely examples and the parameters that have been described above may be used in other methods. Further or alternatively, the information regarding the measurement period may include other parameters.

More particularly, when the information regarding the measurement period indicates one or both the start timing and the end timing of the terminal measurement, each of the start timing and the end timing may be expressed by the unit time (ms). The radio base station 1 may respectively specify, for example, "xx" and "yy" in (the fields of) the control information specifying the start timing and the end timing, and the radio terminal 3 may start the terminal measurement xx (ms) after the timing when it has received the control signaling including this information (i.e., time of reception or time when the reception has been detected) and may end the terminal measurement after yy (ms) elapses. Instead, when each of the start timing and the end timing is expressed by the subframe number, the radio base station 1 may specify, for example, "n" and "m" for (the fields of) the control information that specifies the start timing and the end timing, respectively, and the radio terminal 3 may start the terminal measurement from the subframe #n just after the control signaling including this information is received (i.e., the subframe at which it has been received or the subframe at which the reception has been detected) and continuously perform the terminal measurement until the subframe #m. The same is applicable to a case in which the frame number is used in place of the subframe number. Instead, when each of the start timing and the end timing is expressed by the absolute time, the radio base station 1 may specify the absolute time indicating the start timing or the end timing and the radio terminal may start or end the terminal measurement at the absolute time.

When the information regarding the measurement period indicates the period of the terminal measurement, this period may be expressed by the unit time (ms). The radio base station 1 may specify, for example, "zz" for (the field of) the control information that specifies this period and the radio terminal 3 may perform the terminal measurement during the period of zz (ms) from the timing when it has received the control signaling including this information (i.e., time of reception or time when the reception has been detected). Instead, when the period of the terminal measurement is expressed by the number of subframes, the radio base station 1 may specify "N" for (the field of) the control information that specifies this period and the radio terminal 3 may perform the terminal measurement during the period of N subframes from the timing when it has received the control signaling including this information (i.e., the subframe at which it has been received or the subframe at which the reception has been detected). Instead, when the period of the terminal measurement is expressed by the subframe pattern, the radio base station 1 may specify a 10-bit bitmap (e.g., "0000001111") for (the field of) the control information that specifies this period and the radio terminal 3 performs the terminal measurement in a subframe # corresponding to "1" in the bitmap based on the timing when it has received the control signaling including this information (i.e., the subframe at which it has been received or the subframe at which the reception has been detected). For example, when the control signaling is received in the subframe #2, the LSB (left end) of the 10-bit bitmap corresponds to the subframe #2 and the following bits correspond to the subframes #3, #4, #5, #6, #7, #8, #9, #0, and #1 in this order. Alternatively, each of the bits of the bitmap may be fixedly allocated to the subframes #0, #1, #2, . . . , #9 from the LSB in advance. In this case, the bitmap shown above indicates that the subframes #6, #7, #8, and #9 correspond to the measurement period.

Furthermore, in order to specify the period of the terminal measurement, both the subframe pattern and the subframe offset (start offset) may be used. The radio base station 1 may use the subframe offset to specify, for example, subframe number (subframe #) corresponding to the LSB (left end) of the 10-bit bitmap. When the start offset is set to be 5 in the aforementioned example of the 10-bit bitmap, the LSB corresponds to the subframe #5 and the following bits correspond to the subframes #6, #7, #8. #9, #0, #1, #2, #3, and #4 in this order. The subframe pattern may be expressed by a bitmap having another number of bits (e.g., successive 40 subframes in a 40-bit bitmap) or may be expressed by another data format (e.g., a list of subframes (#) corresponding to the terminal measurement period). The same is applicable also to a case in which the frame pattern is used in place of the subframe pattern. The frame offset may be additionally used. The frame pattern may also be expressed by the bitmap or by another data format.

Note that the information regarding the measurement period and the specific data format for indicating this information in the aforementioned examples are merely examples and another combination can be used.

Specific Example 3

A specific example 3 according to the first embodiment will be described. The difference from the specific example 2 is that an L2 control signal (MAC signaling) including control information (MAC Control Element: MAC CE) of a Media Access Control (MAC) layer transmitted in the downlink shared channel (DL-SCH) is used as the control signaling that transmits the instruction for the terminal measurement on the unlicensed frequency (F2). In the control signaling, an Unlicensed Band Measurement MAC CE (or may be another name such as an Unlicensed Frequency Measurement MAC CE, an Unlicensed Spectrum Measurement MAC CE, an LTE-U MAC CE or the like) is used as the control information defined for the instruction for the terminal measurement on the unlicensed frequency. A new value of an identifier (Logical Channel Identity: LCID) used for generation and restoration of a MAC Sub header corresponding to the Unlicensed Band Measurement MAC CE may be defined (e.g., LCID Index=11xxx (e.g., 11001) for DL-SCH).

In the specific example 3, when the radio terminal (UE) 3 receives the control signaling (MAC signaling) and successfully detects (restores) the Unlicensed Band Measurement MAC CE, the radio terminal (UE) 3 recognizes that it has been instructed to perform the terminal measurement in the cell (Cell #2) on the unlicensed frequency (F2). In order to achieve this process, the radio base station (LTE-U eNB) 1 may send, to the radio terminal (UE) 3 in the cell (Cell #1) on the licensed frequency (F1) in advance using for example an RRC signaling, the configuration information (Measurement Configuration: MeasConfig) that is necessary for the terminal measurement for the cell (Cell #2) on the unlicensed frequency (F2).

Further, the Unlicensed Band Measurement MAC CE includes information regarding the measurement period of the terminal measurement on the unlicensed frequency (e.g., F2). The information regarding the measurement period may be similar to or different from the information described in the modified example of the specific example 2.

Figure 6:
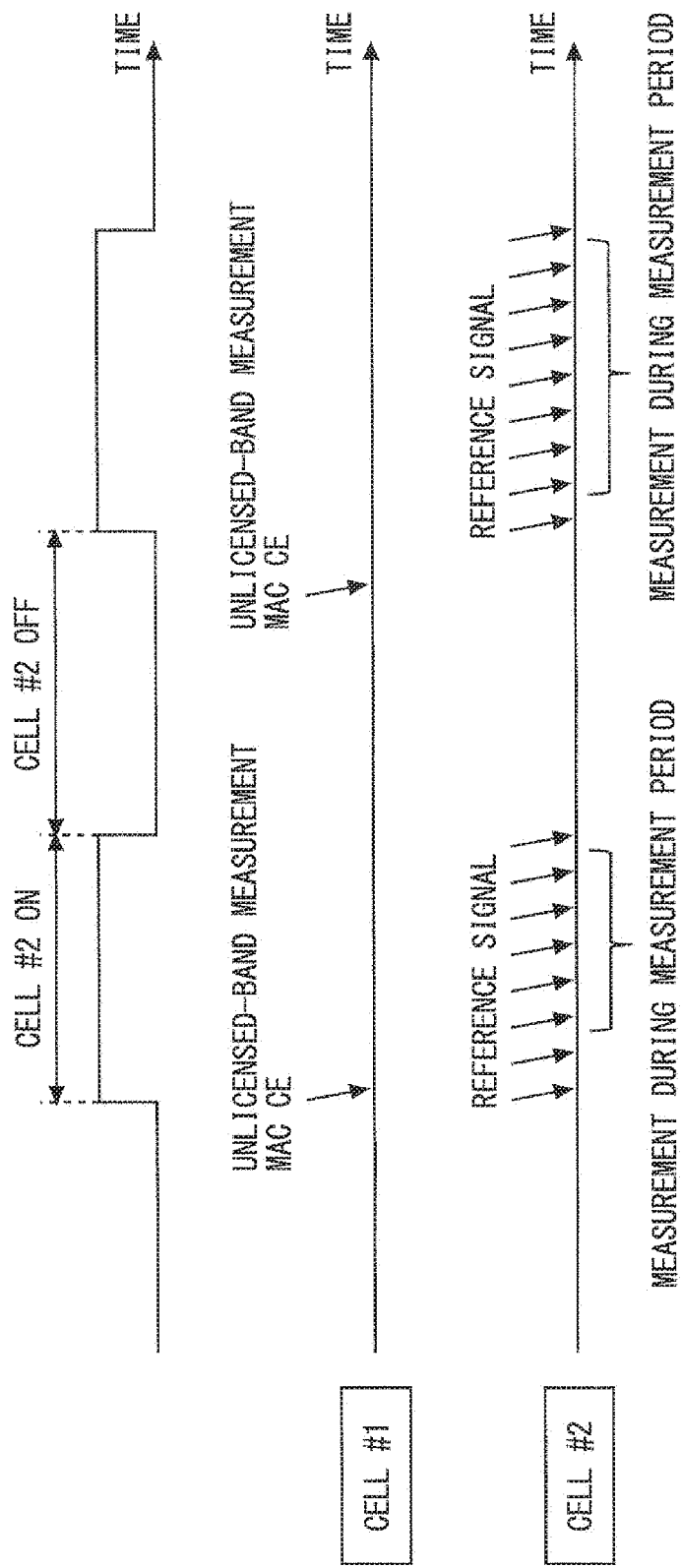
FIG. 6 is a diagram showing one example of terminal measurement by the radio terminal according to the first embodiment (specific example 3)

FIG. 6 is a diagram for describing the terminal measurement performed by the radio terminal (UE) 3 in the cell (Cell #2) on the unlicensed frequency (F2) according to the specific example 3. Similar to FIG. 5 related to the specific example 2, in the specific example 3, the radio base station (LTE-U eNB) 1 dynamically switches the operation state of the Cell #2 based on, for example, the result of sensing for other systems. When the LTE-U eNB 1 determines that the Cell #2 should be switched on, the LTE-U eNB 1 transmits the control signaling (MAC signaling) including the aforementioned Unlicensed Band Measurement MAC CE in the cell (e.g., Cell #1) on the licensed frequency to instruct the UE 3 to perform the terminal measurement in the Cell #2. Upon receiving the control signaling, the UE 3 performs the terminal measurement in the Cell #2. In this example, the control signaling includes the information regarding the measurement period and the UE 3 performs the terminal measurement in accordance with this information.

Similar to the description in the modified example of the specific example 2, the method of the terminal measurement in the Cell #2 may vary depending on the information regarding the measurement period. In the specific example 3, however, the control signaling (MAC signaling) is different from that of the modified example of the specific example 2, so that the operation in the specific example 3 is not the same as that in the specific example 2. For example, when the start timing of the terminal measurement is not explicitly specified, the terminal measurement may be started in response to the control information (Unlicensed Band Measurement MAC CE) transmitted in the control signaling being successfully detected (decoded) in the UE 3. Alternatively, the start point of the measurement period (measurable period) of the terminal measurement may be set to the time point at which the control information (Unlicensed Band Measurement MAC CE) transmitted by the control signaling has been successfully detected (decoded) in the UE 3.

Specific Example 4

A specific example 4 according to the first embodiment will be described. The difference from the specific examples 1-3 is that the radio terminal (UE) 3 performs the terminal measurement (in the cell (Cell #2)) on the unlicensed frequency (F2) as specified in advance. Specifically, the radio base station (LTE-U eNB) 1 transmits, to the radio terminal (UE) 3 by an RRC signaling or the like in advance, the configuration information (Measurement Configuration: MeasConfig) that is necessary for the terminal measurement in the cell (Cell #2) on the unlicensed frequency (F2). Further, the LTE-U eNB 1 includes, in the MeasConfig, configuration information about a terminal measurement gap used for the terminal measurement (Measurement Gap Configuration: MeasGapConfig)

In the specific example 4, similar to the specific example 2, the L1/L2 control signal transmitted in the physical downlink control channel (PDCCH or the aforementioned U-PDCCH) is used as the control signaling that transmits the instruction for the terminal measurement on the unlicensed frequency (F2). The control signaling (L1/L2 control signal) is transmitted using the aforementioned U-RNTI. Further, in the specific example 4, this control signaling includes an instruction for execution of the terminal measurement gap (i.e., an instruction for activation of the terminal measurement gap). The instruction for execution of the terminal measurement gap corresponds to the information regarding the measurement period. The instruction for execution of the terminal measurement gap may instruct, for example, execution of the terminal measurement in accordance with MeasGapConfig that has been transmitted (specified) in advance. Further, when the LTE-U eNB 1 notifies the UE 3 of a plurality of MeasGapConfigs (i.e., patterns of the terminal measurement gap) in advance, the instruction for execution of the terminal measurement gap may indicate one of the MeasGapConfigs with which the terminal measurement should be executed.

Figure 7:
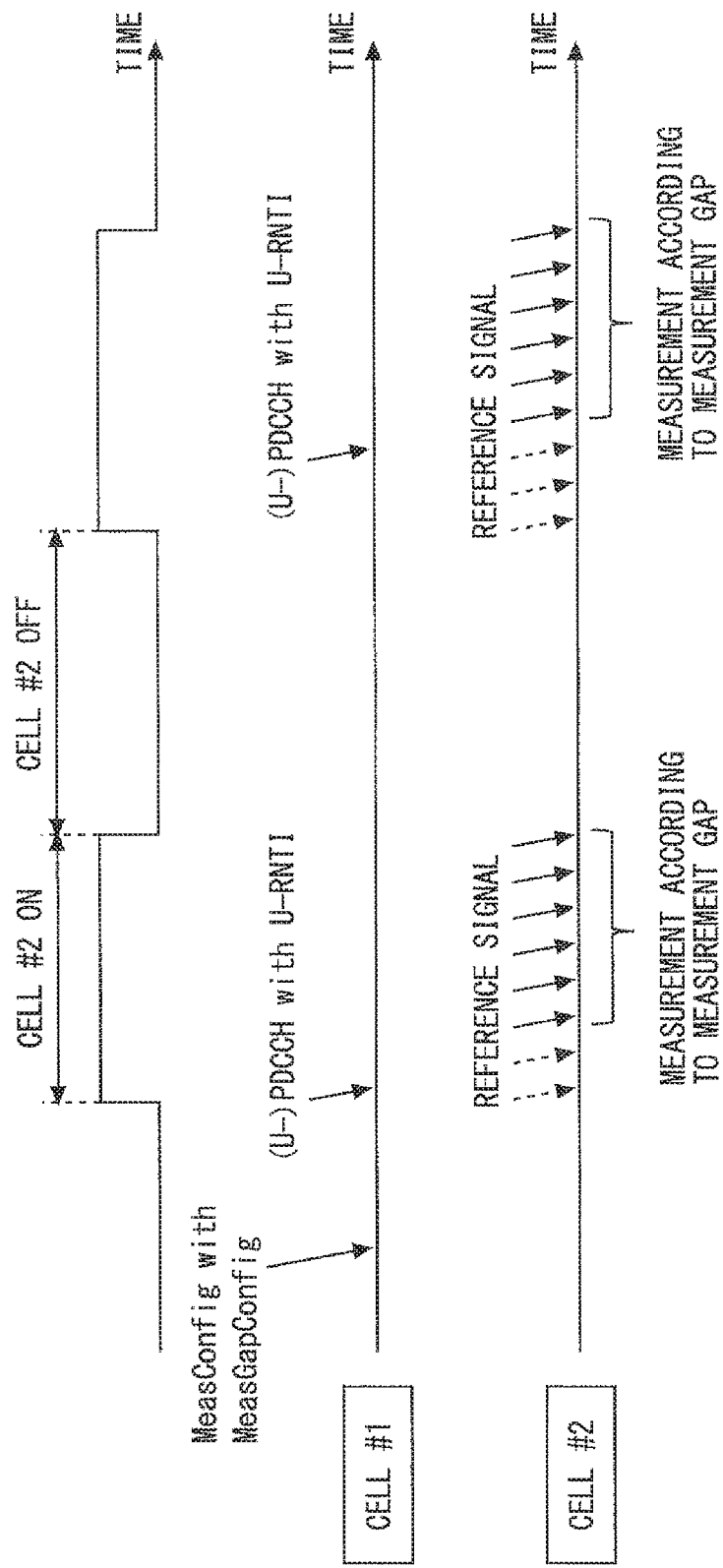
FIG. 7 is a diagram showing one example of terminal measurement by the radio terminal according to the first embodiment (specific example 4)

FIG. 7 is a diagram for describing the terminal measurement by the radio terminal (UE) 3 in the cell (Cell #2) on the unlicensed frequency (F2) according to the specific example 4. Similar to FIGS. 5 and 6 according to the specific examples 2 and 3, the radio base station (LTE-U eNB) 1 dynamically switches the operation state of the Cell #2 based on, for example, the result of sensing for other systems. The LTE-U eNB 1 transmits MeasConfig including MeasGapConfig, in advance, to the UE 3 in the cell (e.g., the Cell #1) on the licensed frequency. When the LTE-U eNB 1 determines that the Cell #2 should be switched on, the LTE-U eNB 1 transmits the control signaling (L1/L2 control signal), which is transmitted by (U-)PDCCH using the aforementioned U-RNTI, in the cell (e.g., the Cell #1) on the licensed frequency to instruct the UE 3 to perform the terminal measurement in the Cell #2. Upon receiving the control signaling, the UE 3 performs the terminal measurement in the Cell #2 in accordance with the Measurement Gap specified by the MeasGapConfig.

FIG. 7 shows, as an example, a case in which the length of the terminal measurement gap (Measurement Gap Length) is 6 ms. When the UE 3 receives the control signaling ((U-)PDCCH) and recognizes that it has received the instruction for performing the terminal measurement in the Cell #2, the UE 3 immediately activates the terminal measurement gap and starts the terminal measurement. Then the UE 3 executes the terminal measurement in the Cell #2 for the period of 6 ms in accordance with the Measurement Gap Length. The target of the terminal measurement may be a plurality of cells in one unlicensed frequency (F2) or may be a plurality of cells in a plurality of unlicensed frequencies.

Accordingly, it is possible to dynamically execute the terminal measurement while maintaining the reliability (accuracy) that is necessary for the terminal measurement in the cell (Cell #2) on the unlicensed frequency (F2).

FIG. 7 shows an example in which one-shot terminal measurement using the terminal measurement gap (i.e., one-shot terminal measurement for the length of the terminal measurement gap) is executed every time the radio terminal 3 receives the control signaling (one-shot UE measurement with measurement gap). However, the radio terminal 3 may execute the terminal measurement using the terminal measurement gap a plurality of times in a predetermined cycle (multiple UE measurements with periodic measurement gap), in response to receiving the control signaling. For example, the radio base station 1 may notify the radio terminal 3 in advance of the number of times the terminal measurement using the terminal measurement gap is performed or the period in which the terminal measurement is performed.

Further, the radio base station 1 may notify the radio terminal 3 in advance of the configuration information (MeasGapConfig) about the terminal measurement gap of a plurality of patterns and the index to specify each of the plurality of patterns. The radio base station 1 may send the control signaling ((U-)PDCCH) indicating the index corresponding to the pattern of terminal measurement gap that should be executed.

Further, the radio base station 1 may notify the radio terminal 3 of a waiting time (Activation Time) until the radio terminal 3 executes the terminal measurement gap after it receives the control signaling ((U-)PDCCH) or a start offset (GapOffset) in the execution of the terminal measurement gap, by using the configuration information about the terminal measurement gap (MeasGapConfig).

Further, the radio base station 1 may specify, by the control signaling, the information regarding the measurement period similar to that in the modified example of the specific example 2. For example, when one or both of the start timing and the end timing of the terminal measurement is specified, the start timing and the end timing of the terminal measurement may respectively indicate the start timing and the end timing of the terminal measurement gap. Further, when the period of the terminal measurement is specified, this period may indicate the period in which the terminal measurement gap is effective (i.e., the period in which the terminal measurement using the terminal measurement gap is performed).

Modified Example of Specific Example 4

A modified example of the aforementioned specific example 4 will be described. The difference from the specific example 4 is that the control signaling indicating the instruction for performing the terminal measurement in the cell (the Cell #2) on the unlicensed frequency (F2) is an L2 control signal (MAC signaling). This can be achieved, for example, by adding the information transmitted by (U-) PDCCH described in the specific example 4 to the Unlicensed Band Measurement MAC CE described in the specific example 3. Since the other details are similar to those in the specific example 4, the descriptions thereof will be omitted.

The aforementioned terminal measurement may be, for example, calculation of an instantaneous measurement value of the reception quality of the reference signal, may be execution of a primary measurement (L1 filtering), or may be execution of a secondary measurement (L3 filtering). Further, the contents of the terminal measurement in the following descriptions may be different from those stated above.

Second Embodiment

Figure 8:
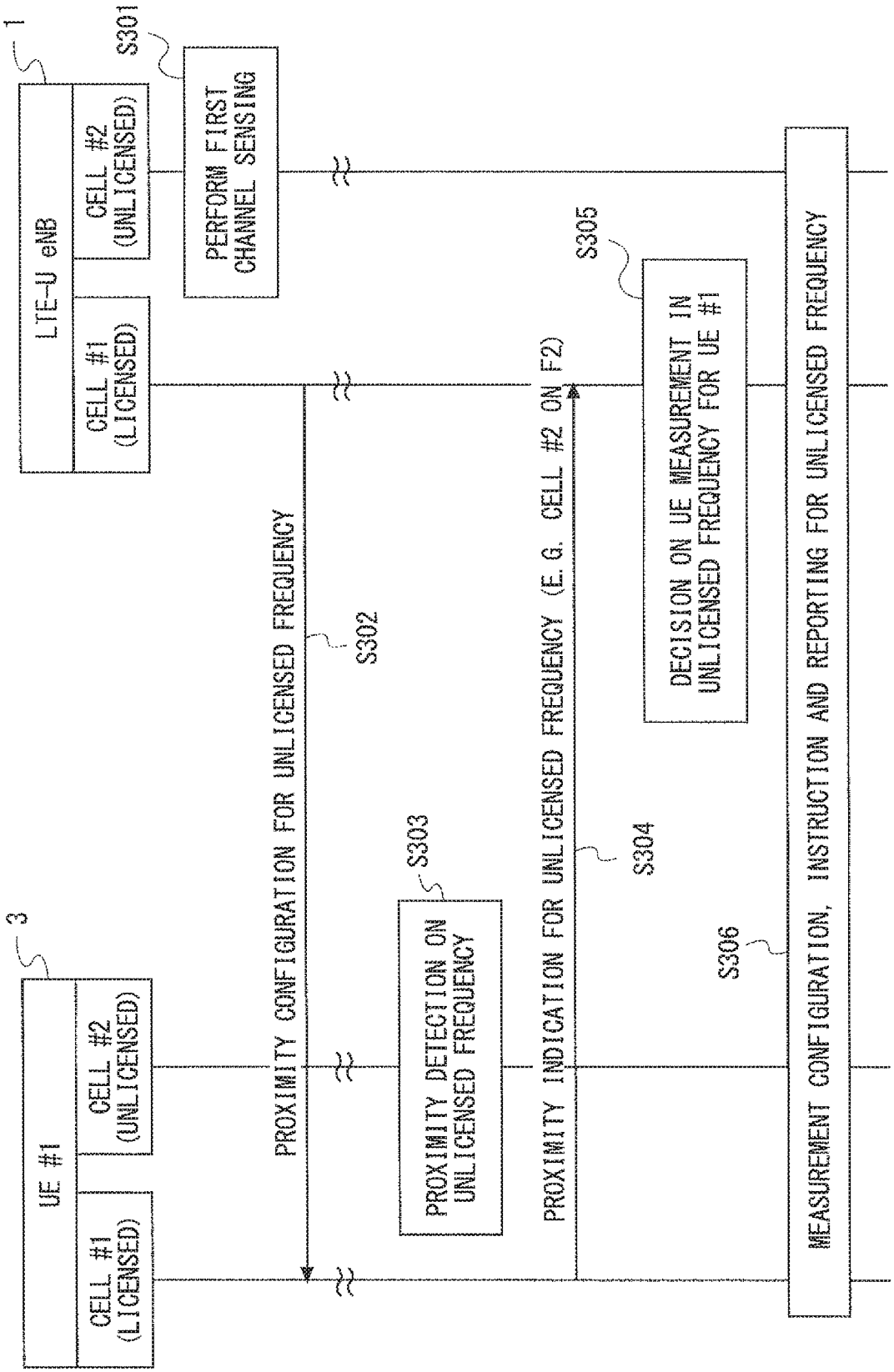
FIG. 8 is a sequence diagram showing one example of operations of a radio base station and a radio terminal according to a second embodiment.

A second embodiment will be described. In this embodiment, prior to execution of the terminal measurement in a cell on the unlicensed frequency described in the first embodiment, the radio base station (LTE-U eNB) 1 selects the radio terminal (UE) 3 to which the instruction for performing the terminal measurement is to be sent. The details thereof will be described with reference to FIG. 8. In FIG. 8, the LTE-U eNB 1 manages a cell (Cell #1) on the licensed frequency (F1) and a cell (Cell #2) on the unlicensed frequency (F2). In this embodiment, the radio terminal (UE) 3 has a detection function for detecting proximity to a cell on the unlicensed frequency and a report function for reporting the detection result to the radio base station upon detection of the proximity. While the following description will be given assuming a case in which the cell on the unlicensed frequency is a non-serving cell for the radio terminal, the cell on the unlicensed frequency may be a serving cell (or a configured cell). The radio terminal 3 is denoted as "UE #1" in FIG. 8.

In FIG. 8, the UE 3 first establishes a radio connection (RRC Connection Establishment) with the LTE-U eNB 1 in the Cell #1 as the serving cell and establishes a bearer (e.g., EPS bearer, E-RAB) with a core network (EPC) (not shown). Then, the UE 3 enters a state in which, for example, the UE 3 can transmit and receive user data. The LTE-U eNB 1 performs first sensing on the unlicensed frequency (e.g., F2) (Perform first channel sensing, S301). The first sensing includes CAC for radar systems, CCA for other systems such as WLAN, CCA for LTE-U served by other operators (service providers), or two of them, or all of them.

Upon determining that the unlicensed frequency (e.g., F2) is available by the first sensing (S301), the LTE-UE eNB 1 transmits, to the UE 3 in the Cell #1, a notification regarding detection of proximity of a cell on the unlicensed frequency (Proximity configuration for unlicensed frequency, S302). Upon receiving the notification (i.e., in response to the notification), the UE 3 attempts to detect proximity of the UE 3 to a cell (e.g., the Cell #2) on the unlicensed frequency (e.g., F2) (i.e., enables (activates) the detection function). When the UE 3 has successfully detected a non-serving cell on the unlicensed frequency (Proximity detection on unlicensed frequency (cell), S303), the UE 3 reports the result of the detection to the LTE-U eNB (Proximity indication for unlicensed frequency. S304).

The notification regarding detection of proximity of a cell on the unlicensed frequency may include, for example, at least one of: information about one or more unlicensed frequencies on which the proximity detection is to be performed: and information about cell(s) on these unlicensed frequency(ies). The information about the unlicensed frequency(ies) may include, for example, one or any combination of the following items:

a frequency identifier of LTE (e.g., the EARFCN);
an unlicensed frequency identifier (e.g., the Unlicensed frequency index); and
a (center) frequency (e.g., the carrier frequency).

The unlicensed frequency identifier may be defined as a number or an index newly added to an unlicensed frequency that is available for LTE-U.

The information about the cell(s) on the unlicensed frequency(ies) may include, for example, one or any combination of the following elements:

a cell identifier (e.g., a PCI, an ECGI, or a Virtual Cell ID); and
an unlicensed frequency cell identifier (e.g., an Unlicensed Cell ID).

The Virtual Cell ID may be, for example, a scrambling code identifier (e.g., a Scrambling Identity or a Scrambling Code ID) used to transmit a reference signal or another signal in the cell on the unlicensed frequency. The unlicensed frequency cell identifier may be defined as a cell number or a cell index newly added to a cell on an unlicensed frequency.

Furthermore, the aforementioned notification may include another network identifier (e.g., a PLMN ID, the TAI, or a TAC). When this notification includes these network identifiers, the radio terminal 3 may use the specified network identifiers to differentiate cell(s) to which the proximity of the radio terminal 3 is to be detected from other cells.

Referring once again to FIG. 8, the explanation will be continued. Based on the report from the UE 3, the LTE-eNB 1 determines to instruct the UE 3 to perform the terminal measurement in the cell (e.g., the Cell 2) on the unlicensed frequency (e.g., F2) (Decision on UE measurement in unlicensed frequency for UE #1, S305). The LTE-eNB 1 and the UE 3 then execute a procedure for the terminal measurement report regarding the unlicensed frequency, similar to the first embodiment (Measurement Configuration, Instruction and Reporting for Unlicensed Frequency. S306).

As shown in FIG. 8, in this embodiment, prior to transmitting the control signaling, the radio base station (LTE-U eNB) 1 receives from the radio terminal (UE) 3 the result of the detection of proximity of the radio terminal (UE) 3 to a non-serving cell(s) on the unlicensed frequency (e.g., F2) and determines to transmit the control signaling to the radio terminal (UE) 3 based on the result of the detection of the proximity (or in response to the result of the detection of the proximity). Accordingly, for example, the radio base station (LTE-U eNB) 1 can determine prospective UE(s) that can contribute to improving throughput by LTE-U based on the result of the detection of proximity to the cell (e.g., the Cell 2) on the unlicensed frequency (e.g., F2). Therefore, for example, the radio base station (LTE-U eNB) 1 can selectively cause prospective UE(s) 3 that can contribute to improve throughput by LTE-U to perform the terminal measurement report, which is used for determining whether to allow the radio terminal (UE) 3 to perform LTE-U using the cell on the unlicensed frequency. As a result of this, it is expected to reduce the power consumption and also reduce the control information necessary for the terminal measurement report, regarding the UEs 3 that do not have to send the terminal measurement report. This is especially effective when the operation state of the cell on the unlicensed frequency is dynamically changed, that is, when On/Off of the cell is aperiodically switched.

The detection of proximity to a cell on the unlicensed frequency by the radio terminal (UE) includes, for example, detection of a cell-specific signal transmitted from the radio base station (LTE-U eNB) 1 in the cell. The cell-specific signal contains at least one of a known symbol and a known sequence. The cell-specific signal may be, for example, a synchronization signal (in LTE, the synchronization signal includes a Primary SS (PSS) and a Secondary SS (SSS)), a reference signal (RS), or basic information (Master Information Block (MIB)) or system information (System Information Block (SIB), e.g., SIB1, S1B2, or SIBx defined for LTE-U) broadcasted in the cell. In this case, the radio terminal 3 may detect proximity to the cell on the unlicensed frequency based on, for example, whether the reception quality (e.g., RSRP, RSRQ, RSSI, SINR, or CQI) of the cell-specific signal (e.g., RS) is equal to or larger than a predetermined threshold (or larger than the threshold). Instead, the radio terminal 3 may detect proximity to the cell based on whether it has successfully received the basic information (MIB) or the system information (SIB) broadcasted in the cell. The reference signal may include, for example, at least one of: a cell specific reference signal (Cell Specific RS (CRS)), a reference signal (CSI RS) for a measurement report regarding channel state information (CSI), and a reference signal for cell detection (Discovery RS (DRS)). The DRS may be a combination of two or more of the PSS, the SSS, the CRS, and the CSI RS, or may be a new reference signal defined for the cell detection.

When the radio terminal (UE) 3 has received, from the radio base station (LTE-U eNB) 1, the notification regarding the detection of proximity to the cell on the unlicensed frequency, the radio terminal (UE) 3 may consider that it has been configured to perform detection on the unlicensed frequency (i.e., UE considers itself to be configured to perform proximity check for unlicensed frequency), or consider that it has been configured to transmit a notification (proximity indication) indicating that the proximity to the cell in the unlicensed frequency has been detected (i.e., UE considers itself to be configured to provide proximity indication for unlicensed frequency). The "proximity check" is also referred to as "proximity estimation". Further, the radio base station (LTE-U eNB) 1 may explicitly instruct the radio terminal (UE) 3 to perform the detection by this notification or may implicitly instruct the radio terminal (UE) 3 to perform the detection by including, in this notification, information regarding the unlicensed frequency to be detected or information regarding the cell on the unlicensed frequency.

Further, the notification regarding the detection of the proximity to the cell on the unlicensed frequency may be transmitted, for example, as dedicated control information by an RRC signaling (message). In this case, the RRC message corresponding to this notification may be an RRC Connection Reconfiguration message and a "ReportProximityUnlicensedConfig" IE may be newly defined as an RRC information element (IE) included therein. This IE includes, besides information to enable the function for detecting the proximity to the cell on the unlicensed frequency (i.e., proximityindicationUnlicensed is set to enabled), information about the target unlicensed frequency. Further, the RRC message may contain identification information regarding the cell on the unlicensed frequency (e.g., a physical cell identifier (PCI) or a global cell identifier (EUTRAN Cell Global ID (ECGI))). This notification may be transmitted on broadcast information (System Information (SI), System Information Block (SIB)), instead of the RRC signaling.

Furthermore, the notification indicating that the proximity to the cell on the unlicensed frequency has been detected (proximity indication) may also be transmitted by an RRC signaling (message). In this case, a "ProximityIndicationUnlicensed" message may be newly defined as an RRC message corresponding to this notification. This message includes a "ProximityIndicationUnlicensed" IE for indicating the result of the detection of the proximity to the cell on the unlicensed frequency. This IE may include information indicating that the proximity has been detected and information about the target unlicensed frequency. The IE may also include identification information about the cell (e.g., PCI or ECGI) on the unlicensed frequency that has been detected.

While the detection of proximity to a cell means that the radio terminal 3 detects that it has come into the vicinity (area, region) of one or more cells on the target unlicensed frequency, a case in which the radio terminal 3 has already been in the vicinity of the cell before the detection of the proximity to the cell is started (attempted) is also included within the scope of this embodiment. Further, the detection of the proximity to a cell may be thought of as being (considered to be) an estimation of the proximity to a cell, detection of availability of a cell, or more simply detection (discovery) of a cell.

Third Embodiment

Figure 9:
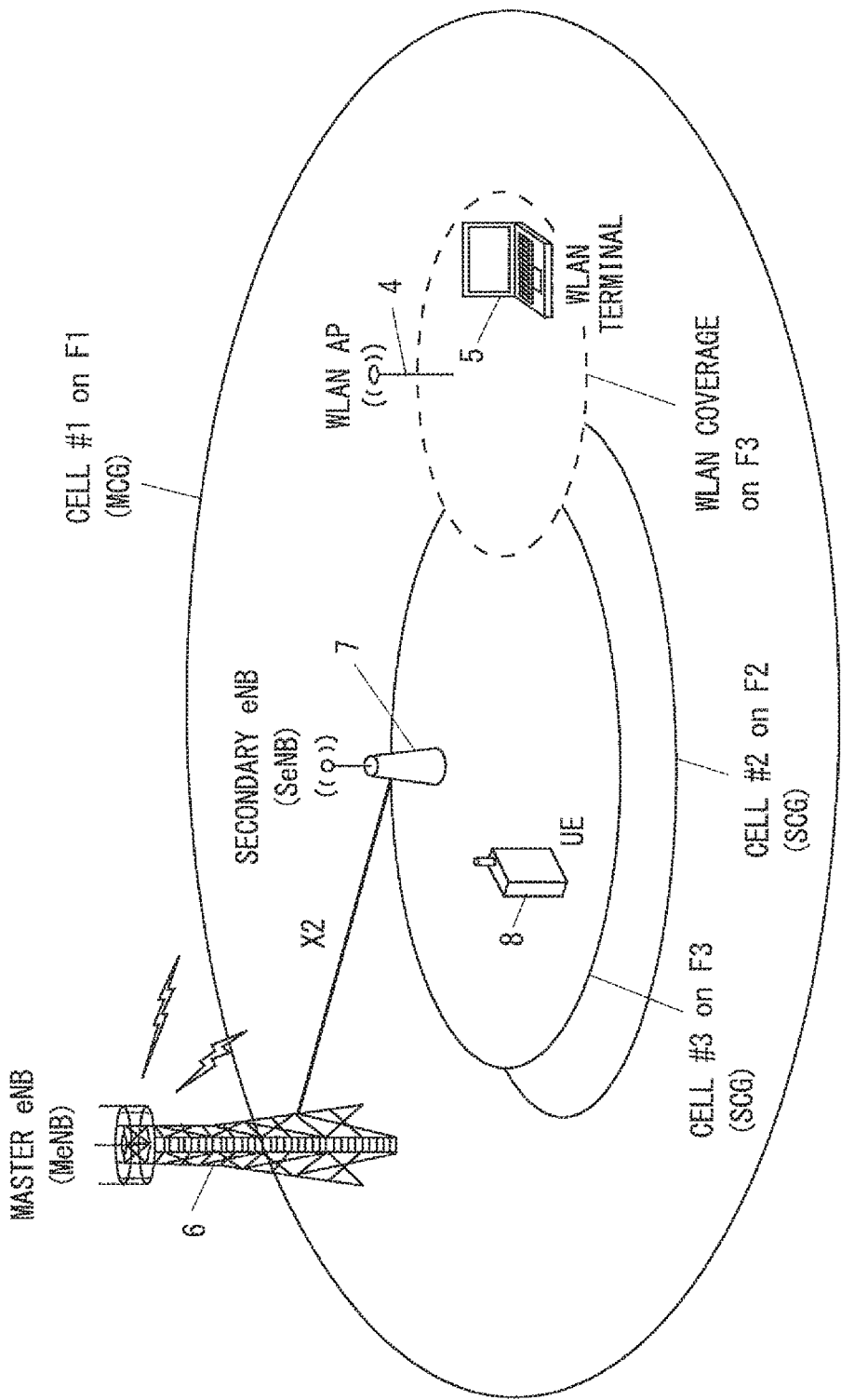
FIG. 9 is a diagram showing a configuration example of the radio communication system and the other radio system according to several embodiments.

A third embodiment according to the present invention will be described. FIG. 9 is a diagram showing a configuration example of an LTE-U radio communication system and another system according to a plurality of embodiments including this embodiment. The main difference from FIGS. 1A and 1B is that radio base stations (eNBs) 6 and 7 and a radio terminal (UE) 8 have a Dual Connectivity (DC) function (Non-Patent Literature 5). The Dual Connectivity is processing in which the UE 8 performs communication simultaneously using radio resources (i.e., cells or carriers) provided (i.e., managed) by a main base station (master base station, Master eNB (MeNB)) 6 and a sub base station (secondary base station, Secondary eNB (SeNB)) 7. In the example shown in FIG. 9, the MeNB 6 and the SeNB 7 are connected to each other via an X2 interface, the MeNB 6 manages Cell #1 on the licensed frequency F1, and the SeNB 7 manages both Cell #2 on the licensed frequency F2 and Cell #3 on the unlicensed frequency F3. The MeNB 6 and the SeNB 7 operate as normal LTE eNBs for UEs that do not perform the DC and are able to independently communicate with these UEs in the Cell #1 and the Cell #2, respectively.

The following briefly describes the Dual Connectivity. The UE 8 is able to perform carrier aggregation (CA) simultaneously using multiple cells that are managed by the MeNB 6 and the SeNB 7 and on different frequencies. The group of serving cells managed by the MeNB 6 is referred to as a Master Cell Group (MCG) and the group of serving cells managed by the SeNB 7 is referred to as a Secondary Cell Group (SCG). The MCG includes at least a Primary Cell (PCell) and may further include one or more Secondary Cells (SCells). The SCG includes at least a Primary SCell (abbreviated as a pSCell or a PSCell) and may further include one or more SCells. The pSCell is a cell to which at least the physical uplink control channel (PUCCH) is allocated and serves as the PCell in the SCG.

The MeNB 6 maintains a connection (S1-MME) with a mobility management apparatus (Mobility Management Entity (MME)) in a core network (Evolved Packet Core (EPC)) for the UE 8 executing the DC. Accordingly, the MeNB 6 may be referred to as a mobility management point (or a mobility anchor) for the UE 8. Therefore, control information of the Control Plane (CP) is transmitted between the MeNB 6 and the UE 8 in the MCG. Control information of the CP regarding the SCG of the SeNB 7 is transmitted between the SeNB 7 and the MeNB 6 (X2 interface) and is further transmitted between the MeNB 6 and the UE 8 in the MCG. For example, Radio Resource Configuration of the SCG (e.g., RadioResoureConfigDedicated IE) is transmitted from the SeNB 7 to the MeNB 6 by an inter-node RRC message referred to as "SCG-Configuration" and is transmitted from the MeNB 6 to the UE 8 by an RRC Connection Reconfiguration message. On the other hand, terminal capability information (UE-EUTRA capabilities IE) of the UE 8, security information (e.g., S-KeNB) about the SCG, Radio Resource Configuration (e.g., RadioResourceConfigDedicated IE) of the MCG and the like are transmitted from the MeNB 6 to the SeNB 7 by an inter-node RRC message referred to as "SCG-ConfigInfo".

In the DC, from the viewpoint of the bearer configuration on the User Plane (UP), three different configurations are supported. The first configuration is an MCG bearer. The MCG bearer is a bearer in which radio protocols are arranged only in the MeNB 6 in order to use only resources (e.g., the MCG) of the MeNB 6 and a connection (S1-U) is maintained between a gateway apparatus (S-GW or P-GW) and the MeNB 6, similar to normal LTE that does not perform the DC. The second configuration is an SCG bearer. The SCG bearer is a bearer in which the radio protocols are arranged only in the SeNB 7 in order to use only resources (e.g., the SCG) of the SeNB 7 and the connection (S1-U) is maintained between the gateway apparatus (S-GW or P-GW) and the SeNB 7. The third configuration is a Split bearer. The Split bearer is a bearer in which the radio protocols are arranged in both the MeNB 6 and the SeNB 7 in order to use resources (e.g., MCG and SCG) both of the MeNB 6 and the SeNB 7. In the Split bearer, the connection (S1-U) is maintained between the gateway apparatus (S-GW or P-GW) and the MeNB 6 and UP data (e.g., PDCP PDU) to be transmitted in the SCG is forwarded, for example, from the MeNB 6 to the SeNB 7 via the X2.

Figure 10:
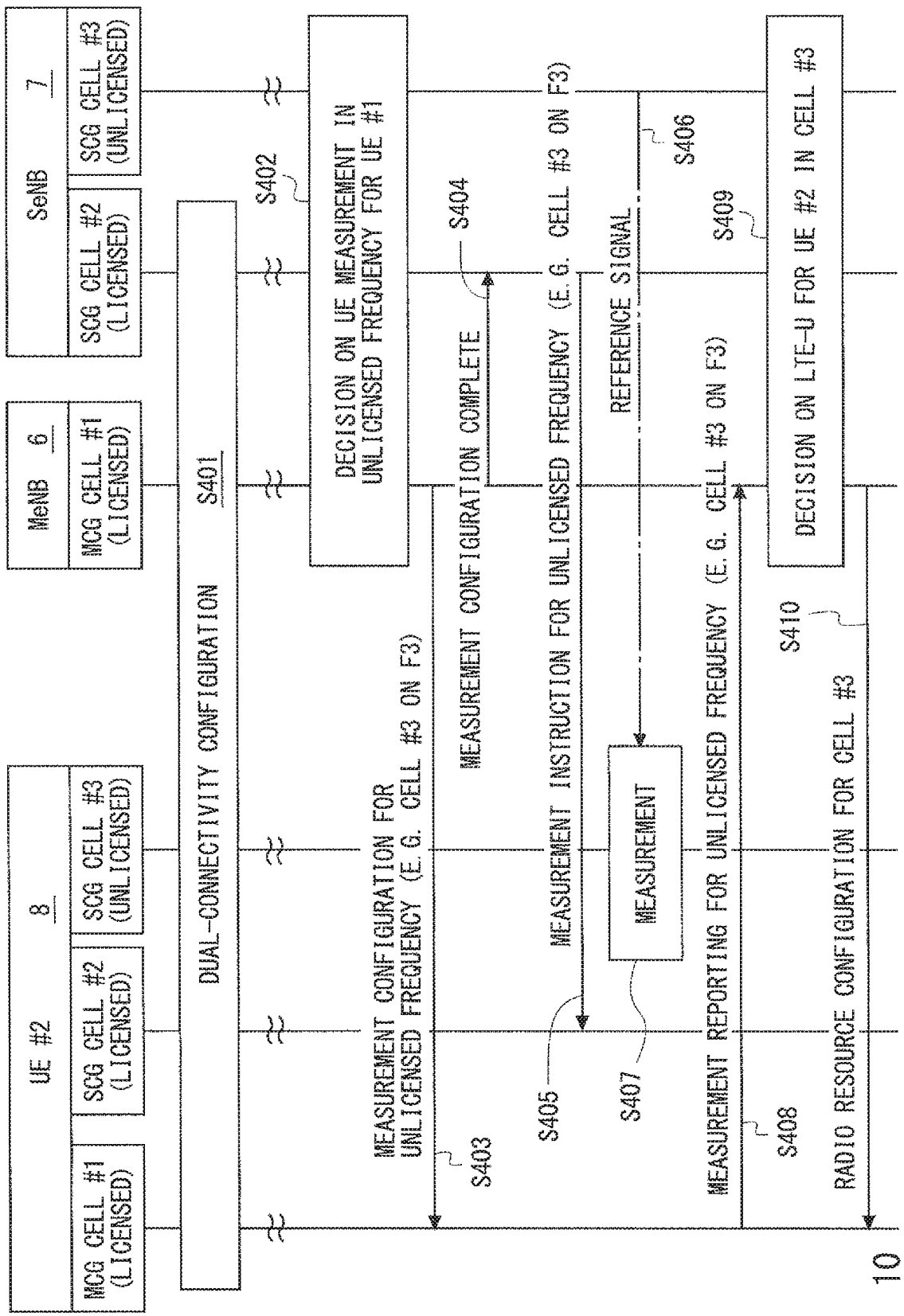
FIG. 10 is a sequence diagram showing one example of operations of two radio base stations and a radio terminal according to a third embodiment.

The following describes the details of this embodiment. In the example of the DC in FIG. 9, when LAA is achieved by carrier aggregation of the Cell #3 on the unlicensed frequency F3 of the SeNB 7 and the Cell #2 on the licensed frequency F2 of the SeNB 7, the problem may not be solved only by the techniques described in the aforementioned first and second embodiments. This is because the SeNB 7 cannot directly transmit or receive control information (e.g., RRC, NAS) of the CP to or from the radio terminal (UE 8) when the DC is performed. The configuration information for the terminal measurement (MeasConfig) and the report regarding the result of the terminal measurement (Measurement report) correspond to the control information of the CP. With reference to FIG. 10, a control procedure for solving the further problem in the DC will be described. FIG. 10 is a sequence diagram showing operations of the radio base stations (the MeNB 6 and the SeNB 7) and the radio terminal (UE) 8 according to the third embodiment. The radio terminal (UE) 8 is denoted as "UE #2" in FIG. 10.

First, the UE 8 establishes a radio connection (RRC Connection) on the Cell #1 of the MeNB 6 as the PCell and performs configuration for the Dual Connectivity (DC) so as to use the Cell #2 of the SeNB 7 as the pSCell (Dual Connectivity Configuration, S401). Then the MeNB 6 or the SeNB 7 determines whether to require the UE 8 to perform the terminal measurement on the unlicensed frequency (e.g., F3) (Decision on UE measurement in unlicensed frequency for UE #2, S402). Upon determining to require the UE 8 of the terminal measurement, the MeNB 6 transmits the configuration information (Measurement configuration (MeasConfig)) necessary for the terminal measurement on the unlicensed frequency (e.g., F3) to the UE 8 in the Cell #1 using for example an RRC Connection Reconfiguration message (Measurement Configuration for Unlicensed Frequency (e.g., Cell #3 on F3), S403). The Measurement configuration may be generated by the SeNB 7 and then be transmitted to the MeNB 6, or may be generated by the MeNB 6. When the MeNB 6 receives from the UE 8 a completion report of the reception of the configuration information (and the reconfiguration in accordance with the configuration information), the MeNB 6 may notify the SeNB 7 of the completion (Measurement Configuration Complete, S404). The notification transmitted in S404 may be included in "SCG-ConfigInfo" of an inter-node RRC container. Alternatively, this notification may be transmitted by an SeNB RECONFIGURATION COMPLETE message on the X2 interface (X2AP).

The SeNB 7 then transmits the instruction for the terminal measurement in the cell (e.g., Cell #3 on F3) on the unlicensed frequency by a predetermined control signaling in the Cell #2 (Measurement Instruction for Unlicensed Frequency (e.g., Cell #3 of F3), S405). The instruction for the terminal measurement is associated with at least one of: a measurement timing indicating a timing when the UE 8 should perform the terminal measurement on the unlicensed frequency (e.g., the Cell #3 in F3) (i.e., when the UE 8 shall perform the terminal measurement); and a measurement period indicating a period in which the UE 8 should perform the measurement (i.e., an appropriate period in which the terminal measurement is executed). In other words, the instruction for the terminal measurement (S405) explicitly or implicitly indicates at least one of the measurement timing and the measurement period (measurable period) of the terminal measurement to be performed by the UE 8 on the unlicensed frequency (e.g., the Cell #3 in F3). Since the details of the measurement timing and the measurement period are the same as those described in the first embodiment, the descriptions thereof will be omitted. The control signaling in S405 may be transmitted by the MeNB 6. In this case, the SeNB 7 may transmit to the MeNB 6 at least a part of the information to be transmitted in the control signaling and the MeNB 6 may then transmit this information to the UE 8. Instead, the MeNB 6 itself may generate the information to be transmitted in the control signaling.

The UE 8 performs the terminal measurement in the Cell #3 in response to the control signaling (S405), that is, in accordance with the instruction for the terminal measurement (Measurement, S407) and reports the result of the terminal measurement to the MeNB in the Cell #1 (Measurement Reporting for Unlicensed Frequency (e.g., Cell #3 on F3), S408). In the terminal measurement (S407), the UE 8 may measure, for example, reception intensity or reception quality of a reference signal (S406) transmitted from the SeNB 7 in the Cell #3. The terminal measurement and the terminal measurement report may be performed not only in the cell (Cell #3) on the unlicensed frequency (F3) but also other cell(s) on F3, in other unlicensed frequency(ies), or in the licensed frequency. Since the details of the terminal measurement are similar to those described in the first embodiment, the descriptions thereof will be omitted.

The MeNB 6 or the SeNB 7 determines whether to perform communication with the UE 8 in the Cell #3 (e.g., downlink data transmission) based on the result of the terminal measurement that has been reported. When the MeNB 6 or the SeNB 7 determines to perform communication with the UE 8 in the Cell #3 managed by the SeNB 7 (Decision on LTE-U for UE #2 in Cell #3, S409), the MeNB 6 transmits, to the UE 8 in the Cell #1, radio resource configuration information regarding the Cell #3 (Radio Resource Configuration, e.g., RadioResourceConfigCommon, RadioResourceConfigDedicated) (Radio Resource Configuration for Cell #3, S410). In this case, the MeNB 6 may use, for example, an RRC Connection Reconfiguration message. The radio resource configuration information regarding the Cell #3 may be generated by the SeNB 7 and then forwarded to the MeNB 6 as SCG-Configuration and the MeNB 6 may transmit the radio resource configuration information to the UE 8. Eventually, the SeNB 7 performs LAA with carrier aggregation of the Cell #2 and the Cell #3, and, for example, transmits user data (DL data) to the UE 8 (not shown).

Using the aforementioned procedure, even when the Dual Connectivity is being executed, it is possible to appropriately determine the radio terminal 3 that is allowed to perform LTE-U (in the cell) on the unlicensed frequency managed by the SeNB 7. As a result, it can be expected to improve performance (e.g., system throughput) of the whole LTE radio communication system.

Specific Example 5

A specific example 5 according to the third embodiment will be described. The specific example 5 provides a procedure for determining, in the MeNB 6 or the SeNB 7, whether to require the UE 8 to perform the terminal measurement on the unlicensed frequency (e.g., F3).

Figure 11:
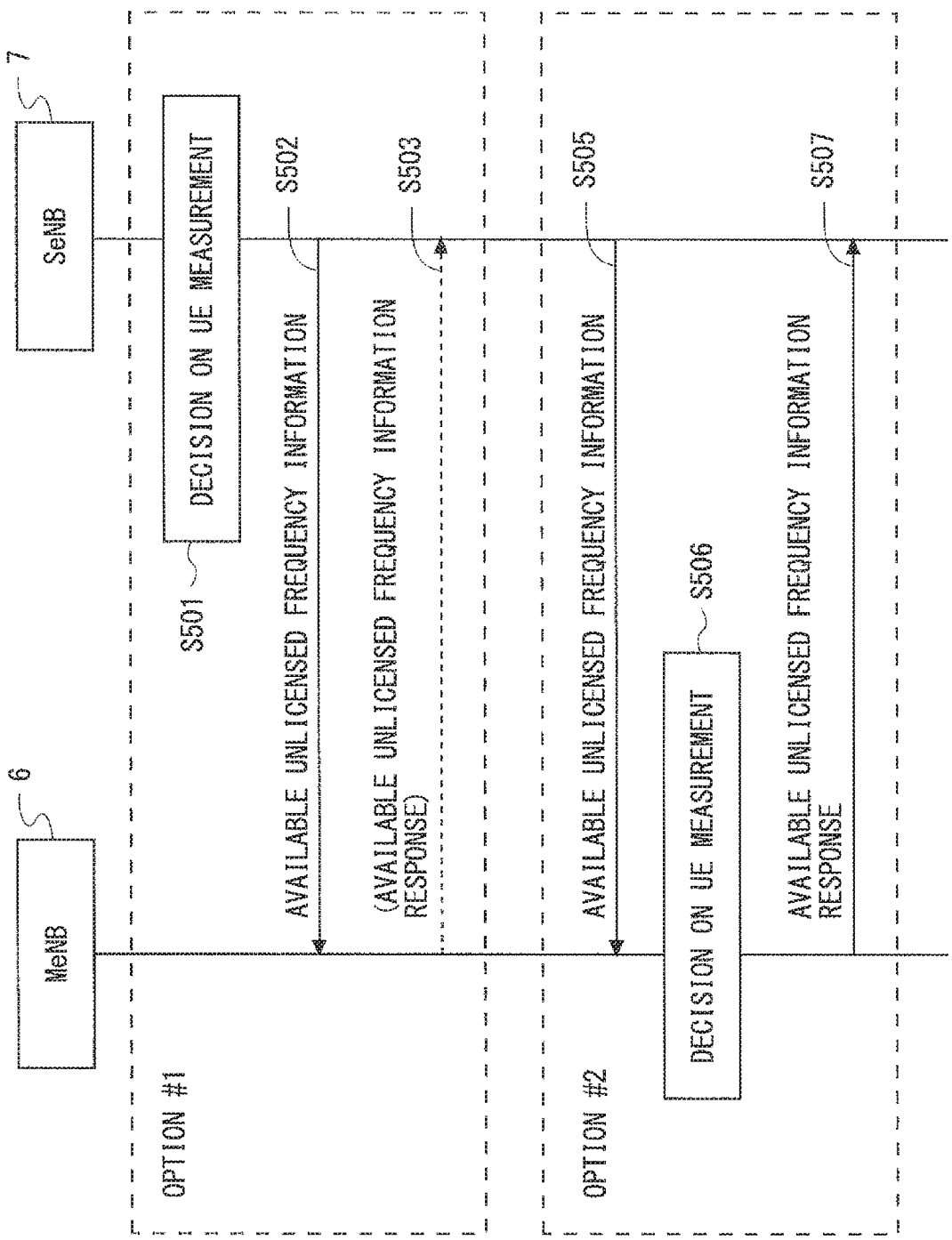
FIG. 11 is a sequence diagram showing an example of operations of two radio base stations (an MeNB and an SeNB) according to the third embodiment (specific example 5)

FIG. 11 is a diagram showing an example of operations of the MeNB 6 and the SeNB 7 including exchange of information (X2 message) in Step S402 "Decision on UE measurement in unlicensed frequency for UE #2" shown in FIG. 10. There are two options for the operations of the MeNB 6 and the SeNB 7. In the first option (Option 1), the SeNB 7 determines whether to require the UE 8 to perform the terminal measurement on the unlicensed frequency (e.g., F3) (Decision on UE measurement, S501). Upon determining to require the UE 8 of the terminal measurement, the SeNB 7 notifies the MeNB 6 of the information about the target unlicensed frequency (Available Unlicensed Frequency information, S502). The MeNB 6 may respond to this notification (S502) (Available Unlicensed Frequency Information Response, S503).

On the other hand, in the second option (Option 2), the SeNB 7 notifies the MeNB 6 of the information regarding the target unlicensed frequency (Available Unlicensed Frequency Information, S505) and the MeNB 6 makes the determination (S506). Then the MeNB 6 transmits the result of the determination to the SeNB 7 (Available Unlicensed Frequency Information Response, S507). The result of the determination may include information indicating that the MeNB 6 instructs the UE 8 to perform the terminal measurement on the unlicensed frequency, or it may simply include an acknowledgement response (ACK). The aforementioned information regarding the target unlicensed frequency may be information about the unlicensed frequency (e.g., EARFCN, Unlicensed frequency index, or carrier frequency) information about the cell on the unlicensed frequency (e.g., PCI, the ECGI, Virtual Cell ID, or Unlicensed Cell ID), or a combination thereof. The information regarding the unlicensed frequency in S502 and S505 may be transmitted by an ENB CONFIGURATION UPDATE message on the X2AP. In particular, this information may be included in a "Served Cells To Add" IE or a "Served Cells To Modify" IE of this message.

Specific Example 6

A specific example 6 according to the third embodiment will be described. The specific example 6 provides a procedure for determining, in the MeNB 6 or the SeNB 7, whether to allow the UE 8 to perform LTE-U in the cell on the unlicensed frequency (e.g., Cell #3 on F3).

Figure 12:
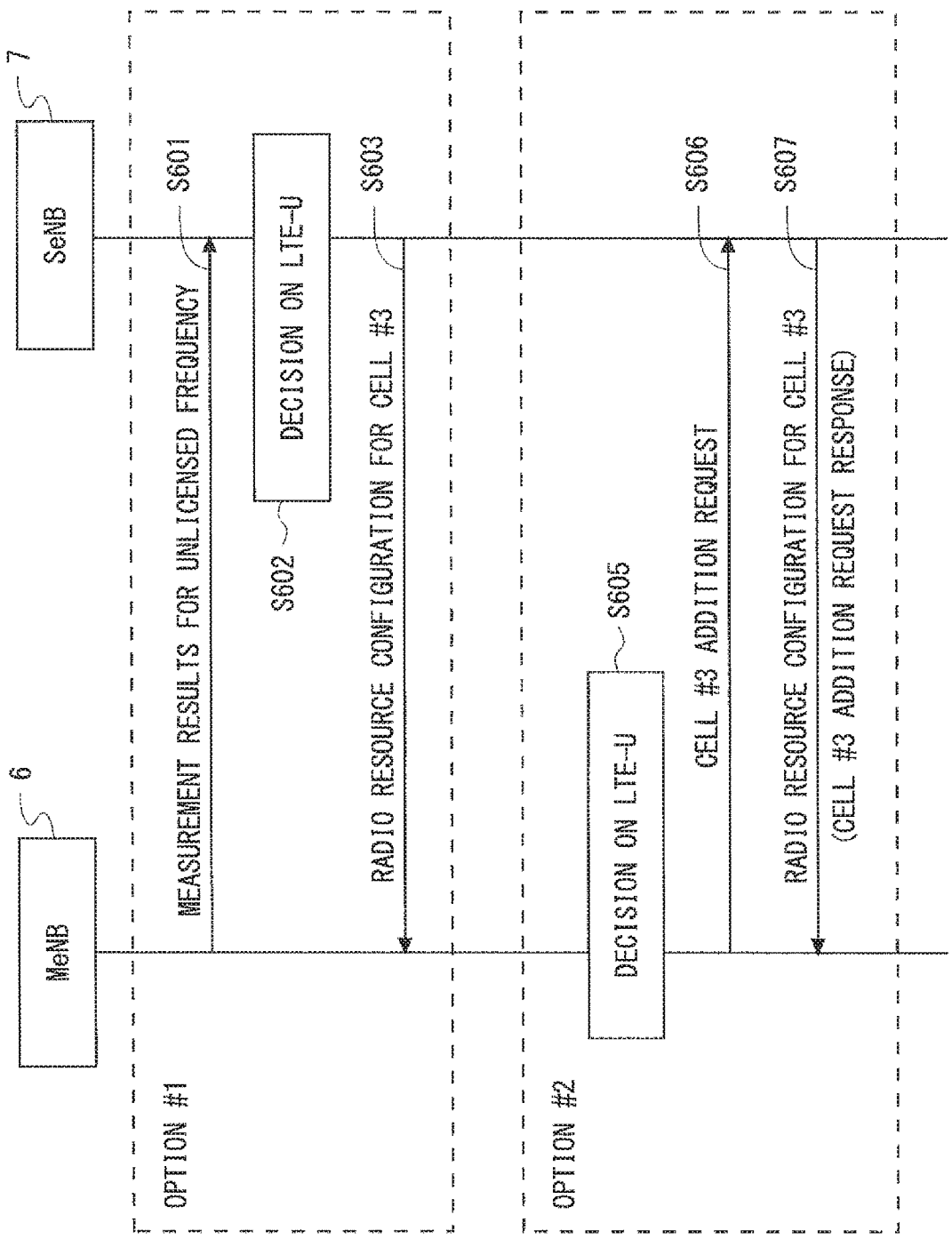
FIG. 12 is a sequence diagram showing an example of operations of the two radio base stations (the MeNB and the SeNB) according to the third embodiment (specific example 6)

FIG. 12 is a diagram showing an example of operations of the MeNB 6 and the SeNB 7 including exchange of information (X2 message) in Step S409 "Decision on LTE-U for UE #2 in Cell #3" in FIG. 10. There are two options for the operations of the MeNB 6 and the SeNB 7. In the first option (Option 1), the MeNB 6 transmits to the SeNB 7 the result of the terminal measurement on the unlicensed frequency received from the UE 8 (Measurement results for unlicensed frequency, S601). The SeNB 7 determines, based on the result of the terminal measurement, whether to allow the UE 8 to perform LTE-U in the cell on the unlicensed frequency (Cell #3 on F3) (Decision on LTE-U. S602). Upon determining to allow the UE 8 to perform LTE-U, the SeNB 7 generates radio resource configuration information (e.g., RadioResourceConfigCommon, RadioResourceConfigDedicated) of the cell (Cell #3) on the target unlicensed frequency and transmits the generated radio resource configuration information to the MeNB 6 (Radio resource configuration for Cell #3, S603).

The result of the terminal measurement in S601 may be transmitted in "SCG-ConfigInfo" of an inter-node RRC container. Alternatively, the result may be transmitted by an SeNB MODIFICATION REQUEST message on the X2AP. Further, the radio resource configuration information in S603 may be transmitted in "SCG-Configuration" of an inter-node RRC container. Alternatively, the information may be transmitted by an SeNB MODIFICATION REQUEST ACKNOWLEDGE message on the X2AP or may be transmitted by an SeNB MODIFICATION REQUIRED message on the X2AP.

On the other hand, in the second option (Option 2), the MeNB 6 determines whether to allow the UE #2 to perform LTE-U in the cell on the unlicensed frequency (Cell #3 on F3) based on the result of the terminal measurement (Decision on LTE-U, S605). Upon determining to allow the UE 8 to perform LTE-U, the MeNB 6 transmits to the SeNB 7 a request for adding the cell (Cell #3) on the target unlicensed frequency to the serving cell(s) (e.g., SCG) (Cell #3 addition request, S606). The information about the Cell #3 included in this request may be indicated by information about the unlicensed frequency (e.g., EARFCN) and the PCI of the Cell #3, or indicated by the ECGI of the Cell #3, or indicated by a combination thereof. The SeNB 7 generates radio resource configuration information (e.g., RadioResourceConfigCommon, RadioResourceConfigDedicated) of the Cell #3 in response to the request and transmits the generated radio resource configuration information to the MeNB 6 (Radio resource configuration for Cell #3, S607).

The request in S606 may be transmitted in "SCG-ConfigInfo" of an inter-node RRC container. Alternatively, this request may be transmitted by an SeNB ADDITION REQUEST message on the X2AP or by an SeNB MODIFICATION REQUEST message on the X2AP. Further, the message in S607 may be transmitted by "SCG-Configuration", similar to the message transmitted in S603. Further, this message may be transmitted by an SeNB ADDITION REQUEST ACKNOWLEDGE message on the X2AP or by an SeNB MODIFICATION REQUEST ACKNOWLEDGE message on the X2AP.

Lastly, configuration examples of the radio base stations (the LTE-U eNB 1, the MeNB 6, the SeNB 7) and the radio terminals (the UE 3, the UE 8) according to the aforementioned embodiments will be described. Each of the radio base stations (the LTE-U eNB 1, the MeNB 6, the SeNB 7) described in the aforementioned embodiments may include a transceiver to communicate with a radio terminal (the UE 3, the UE 8) and a controller that is coupled to the transceiver. This controller executes the control procedure regarding one of the radio base stations (the LTE-U eNB 1, the MeNB 6, the SeNB 7) described in the aforementioned embodiments (e.g., control of the terminal measurement on the unlicensed frequency performed by a radio terminal (the UE 3, the UE 8)).

Each of the radio terminals (the UE 3, the UE 8) described in the aforementioned embodiments may include a transceiver to communicate with a radio base station (the LTE-U eNB 1, the MeNB 6, the SeNB 7) and a controller that is coupled to the transceiver. The controller executes the control procedure regarding one of the radio terminals (the UE 3, the UE 8) described in the aforementioned embodiments (e.g., control of the terminal measurement and the reporting regarding the terminal measurement).

Figure 13:
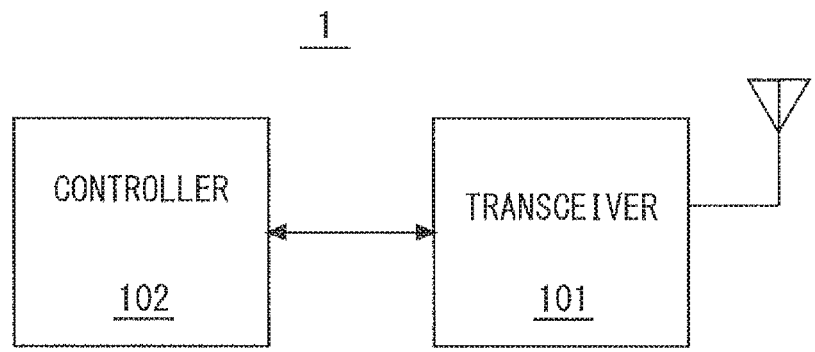
FIG. 13 is a block diagram showing a configuration example of a radio base station according to several embodiments.
Figure 14:
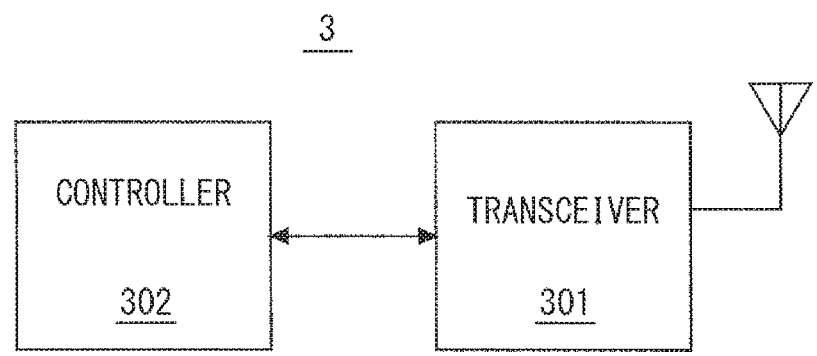
FIG. 14 is a block diagram showing a configuration example of a radio terminal according to several embodiments.
Figure 15:
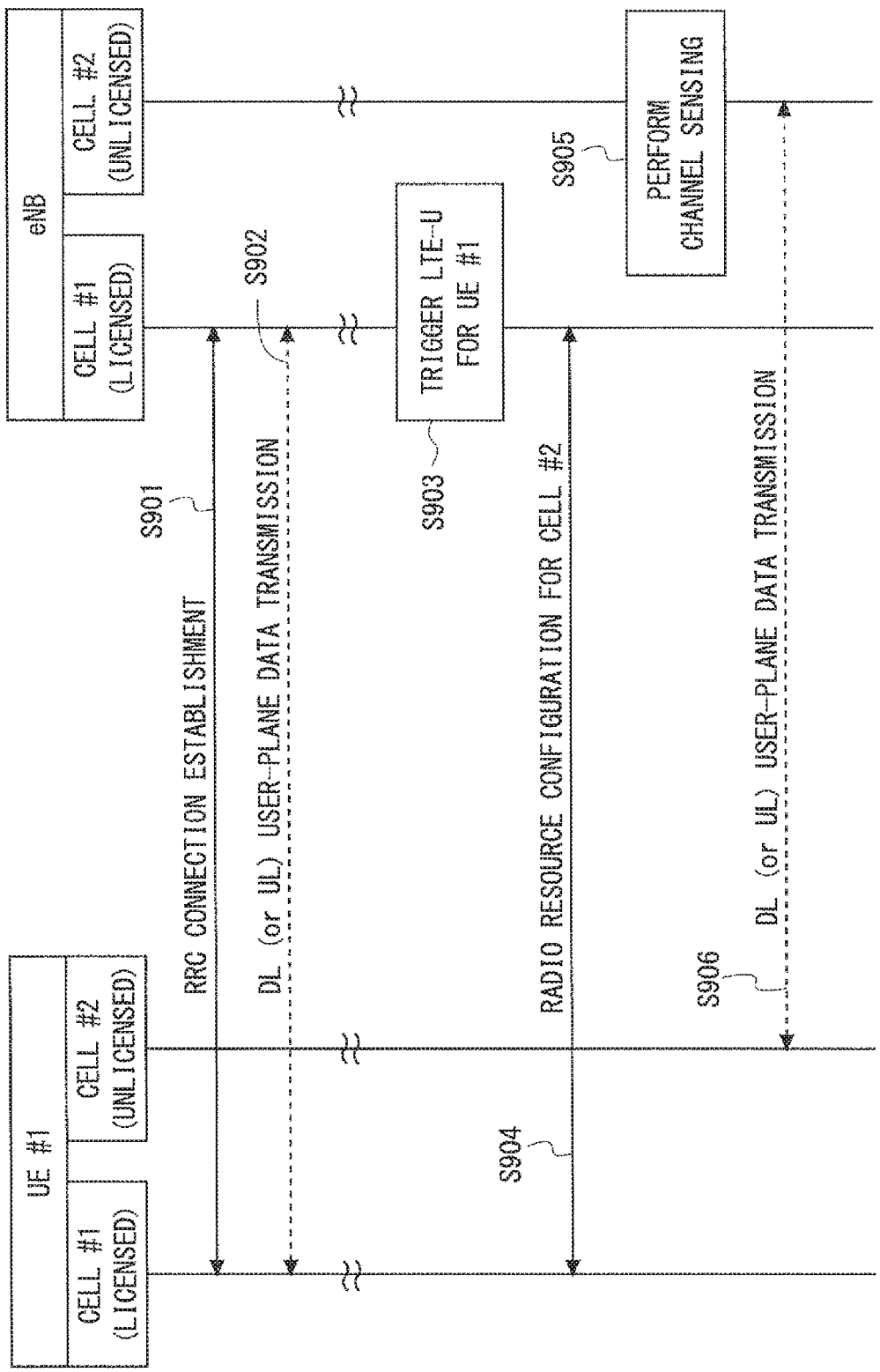
FIG. 15 is a sequence diagram showing one example of operations of a radio base station and a radio terminal in LTE-U.

FIGS. 13 and 14 are block diagrams showing the configuration examples of the radio base station 1 and the radio terminal 3 according to the first embodiment. The radio base stations and the radio terminals according to the other embodiments may have the configurations similar to those in FIGS. 13 and 14. Referring to FIG. 13, the radio base station 1 includes a transceiver 101 and a controller 102. The transceiver 101 is configured to communicate with a plurality of radio terminals including the radio terminal 3. The controller 102 is configured to transmit a notification to the radio terminal 3 and to receive the measurement report from the radio terminal 3 in order to achieve the terminal measurement by the radio terminal 3 on the unlicensed frequency.

Referring to FIG. 14, the radio terminal 3 includes a transceiver 301 and a controller 302. The transceiver 301 is configured to communicate with the radio base station 1. The controller 302 is configured to control the terminal measurement on the unlicensed frequency in accordance with the notification received from the radio base station 1 and to transmit the measurement report to the radio base station 1.

Each of the controllers included in the radio base stations and the radio terminals according to the aforementioned embodiments may be implemented by causing a computer including at least one processor (e.g., a microprocessor, a Micro Processing Unit (MPU), a Central Processing Unit (CPU)) to execute a program. Specifically, one or more programs including instructions that cause the computer to perform an algorithm regarding the UE or the eNB described with reference to sequence diagrams and the like may be supplied to the computer.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM. Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The explanations of the first to third embodiments have been provided with regard to the case where the unlicensed frequency is used for transmitting downlink user data. It is needless to say, however, that these embodiments can be applied to a case in which the unlicensed frequency is used for transmitting uplink user data as well. In this case, the radio terminal (UE) 3 may perform a process similar to the first sensing or the second sensing performed by the radio base station (LTE-U eNB) 1. It is therefore possible to avoid degradation of performance of not only the LTE-U system but also other systems, which is due to transmission of the uplink signal in LTE-U being excessive interference to the other systems.

The explanations of the first to third embodiments have been provided with regard to the case of the LAA. That is, in the first and second embodiments, carrier aggregation (CA) in which the radio base station (LTE-U eNB) 1 and the radio terminal (UE) 3 use the cell on the licensed frequency as the primary cell (PCell) and use the cell on the unlicensed frequency as the secondary cell (SCell) has been mainly described. In the third embodiment, the Dual Connectivity (DC) in which the MeNB 6 and the SeNB 7 use the licensed frequency and the SeNB 7 further uses the unlicensed frequency has been mainly described. However, as already stated above, in the first and second embodiments, the radio base station (LTE-U eNB) 1 may perform carrier aggregation (CA) using a shared frequency (e.g., F3) as the PCell and using an unlicensed frequency in a narrow sense (e.g., F2) or another shared frequency (e.g., F4) as the secondary cell (SCell). The unlicensed frequency in a narrow sense means a frequency that is not allocated to any operator (i.e., a frequency that is neither the licensed frequency nor the shared frequency). In this case, the radio base station (LTE-U eNB) 1 may transmit, to the radio terminal 3 in the PCell (e.g., F3), the control signaling associated with at least one of the measurement timing and the measurement period of the terminal measurement in the SCell (e.g., F2 or F4). In a similar way, in the third embodiment, the MeNB 6 may use a shared frequency and the SeNB 7 may use a shared frequency or an unlicensed frequency in a narrow sense in the Dual Connectivity (DC).

The explanations of the aforementioned embodiments have been provided with regard to the LTE system. However, as already stated above, these embodiments may be applied to radio communication systems other than the LTE system such as the 3GPP UMTS, the 3GPP2 CDMA2000 system (1×RTT, HRPD), the GSM/GPRS system, or the WiMAX system. The radio base station (eNB) and the RRH/RRE having the function of performing the LTE communication on the unlicensed frequency have been referred to as a radio base station (LTE-U eNB). In the other systems as well, a network node capable of communicating on the unlicensed frequency using the same communication scheme as that used for the licensed frequency may be introduced and it may be referred to as a radio station. That is, the radio station corresponds, for example, to a radio base station (eNB) and an RRH/RRE in the LTE as described above, to a base station (NodeB (NB)) and a base station controller (RNC) in the UMTS, or to a base station (BTS) and a base station controller (BSC) in the CDMA2000 system. Further, in the example of the Dual Connectivity (DC) in particular, a base station system including a main base station (MeNB in LTE) and a sub base station (SeNB in LTE) may be referred to as a radio station. Each of the main base station and the sub base station may be referred to as a radio communication node.

Further, in the aforementioned embodiments, the cell on the licensed frequency in which the control signaling for the instruction for the terminal measurement is transmitted (i.e., the PCell in CA or the cell operated by the MeNB in the DC) and the cell on the unlicensed frequency to be the target of the terminal measurement (i.e., the SCell in CA or the cell operated by the SeNB in the DC) may use Radio Access Technologies (RATs) different from each other. For example, the cell on the licensed frequency may be a cell of LTE (E-UTRAN) and the cell on the unlicensed frequency may be a cell of UMTS (UTRAN).

The embodiments stated above are merely examples regarding applications of the technical ideas obtained by the present inventor. These technical ideas are not limited only to the embodiments described above, and various modifications may be made as a matter of course.

This application is based upon and claims the benefit of priority from Japanese Patent Application No. 2014-186949, filed on Sep. 12, 2014, the disclosure of which is incorporated herein in its entirety by reference.

REFERENCE SIGNS LIST

1, 6, 7 RADIO BASE STATION
3, 8 RADIO TERMINAL
4 WIRELESS LAN ACCESS POINT
5 WIRELESS LAN TERMINAL
101, 301 TRANSCEIVER
102, 302 CONTROLLER

The invention claimed is:

1. A radio station comprising:
a memory; and
a processor configured to:
communicate with a radio terminal on a licensed frequency;
transmit, to the radio terminal on the licensed frequency, control information associated with a Received Signal Strength Indicator (RSSI) measurement on a shared spectrum, the control information including first information and an offset value, the first information indicating a first period, wherein
the first period comprises a second period in which a signal can be transmitted and a third period in which the radio terminal is not needed to perform the RSSI measurement, the third period following the second period,
the second period occurs periodically at a periodicity of the first period, and
the offset value indicates a subframe number and a System Frame Number (SFN) at which the second period is started; and
receive, from the radio terminal on the licensed frequency, a result of the RSSI measurement which is performed within the second period started at the subframe number and the SFN indicated by at least the offset value, wherein
the licensed frequency comprises a first licensed frequency and a second licensed frequency,
the radio station comprises a first radio communication node configured to operate a first cell on the first licensed frequency and a second radio communication node configured to operate both a second cell on the second licensed frequency and a third cell on the shared spectrum,
the control information is transmitted from the second radio communication node, and
the result of the RSSI measurement is received by the first radio communication node in the first cell.

2. The radio station according to claim 1, wherein the control information is generated using at least one of: an Unlicensed Radio Network Temporary Identifier (U-RNTI); a Cell measurement Media Access Control (MAC) Control Element (CE) for Unlicensed LTE (LTE-U); a Logical Channel Identity (LCID) for LTE-U; and a Radio Resource Control (RRC) LTE-U measurement config Information Element (IE).

3. The radio station according to claim 1, wherein the control information comprises a Physical Downlink Control Channel that contains a Cyclic Redundancy Check (CRC) part scrambled by an Unlicensed Radio Network Temporary Identifier (U-RNTI).

4. The radio station according to claim 3, wherein the U-RNTI is set by the radio station to a common value for a plurality of radio terminals which are in a radio connected state on the licensed frequency and have a capability of communicating on the unlicensed frequency.

5. The radio station according to claim 1, wherein the control information is applied in common to a plurality of radio terminals which are in a radio connected state in a cell on the licensed frequency and have a capability of communicating on the unlicensed frequency.

6. The radio station according to claim 1, wherein the processor is further configured to:
  receive, from the radio terminal, prior to transmitting the control information, a result of detecting proximity of the radio terminal to a non-serving cell on the unlicensed frequency; and
  determine to transmit the control information to the radio terminal based on the result of detecting the proximity.

7. The radio station according to claim 1, wherein the control information further comprises configuration information about a measurement gap used for the RSSI measurement.

8. A method performed in a radio station, the method comprising:
  communicating with a radio terminal on a licensed frequency;
  transmitting, to the radio terminal on the licensed frequency, control information associated with a Received Signal Strength Indicator (RSSI) measurement on a shared spectrum, the control information including first information and an offset value, the first information indicating a first period, wherein
    the first period comprises a second period in which a signal can be transmitted and a third period in which the radio terminal is not needed to perform the RSSI measurement, the third period following the second period,
    the second period occurs periodically at a periodicity of the first period, and
    the offset value indicates a subframe number and a System Frame Number (SFN) at which the second period is started; and
  receiving, from the radio terminal on the licensed frequency, a result of the RSSI measurement which is performed within the second period started at the subframe number and the SFN indicated by at least the offset value, wherein
    the licensed frequency comprises a first licensed frequency and a second licensed frequency,
    the radio station comprises a first radio communication node configured to operate a first cell on the first licensed frequency and a second radio communication node configured to operate both a second cell on the second licensed frequency and a third cell on the shared spectrum,
    the control information is transmitted from the second radio communication node, and
    the result of the RSSI measurement is received by the first radio communication node in the first cell.

9. A method performed in a radio terminal, the method comprising:
  communicating with a radio station on a licensed frequency; and
  receiving, from the radio station on the licensed frequency, control information associated with a Received Signal Strength Indicator (RSSI) measurement on a shared spectrum, the control information including first information and an offset value, the first information indicating a first period, wherein
    the first period comprises a second period in which a signal can be transmitted and a third period in which the radio terminal is not needed to perform the RSSI measurement, the third period following the second period,
    the second period occurs periodically at a periodicity of the first period, and
    the offset value indicates a subframe number and a System Frame Number (SFN) at which the second period is started;
  performing the RSSI measurement within the second period started at the subframe number and the SFN indicated by at least the offset value; and
  transmitting, to the radio station on the licensed frequency, a result of the RSSI measurement, wherein
    the licensed frequency comprises a first licensed frequency and a second licensed frequency,
    the radio station comprises a first radio communication node configured to operate a first cell on the first licensed frequency and a second radio communication node configured to operate both a second cell on the second licensed frequency and a third cell on the shared spectrum,
    the control information is transmitted from the second radio communication node, and
    the result of the RSSI measurement is received by the first radio communication node in the first cell.

10. A radio terminal comprising:
a memory; and
a processor configured to:
  communicate with a radio station on a licensed frequency; and
  receive, from the radio station on the licensed frequency, control information associated with a Received Signal Strength Indicator (RSSI) measurement on a shared spectrum, the control information including first information and an offset value, the first information indicating a first period, wherein
    the first period comprises a second period in which a signal can be transmitted and a third period in which the radio terminal is not needed to perform the RSSI measurement, the third period following the second period,
    the second period occurs periodically at a periodicity of the first period, and
    the offset value indicates a subframe number and a System Frame Number (SFN) at which the second period is started;
  perform the RSSI measurement within the second period started at the subframe number and the SFN indicated by at least the offset value; and
  transmit, to the radio station on the licensed frequency, a result of the RSSI measurement, wherein
    the licensed frequency comprises a first licensed frequency and a second licensed frequency,
    the radio station comprises a first radio communication node configured to operate a first cell on the first licensed frequency and a second radio communication node configured to operate both a second cell on the second licensed frequency and a third cell on the shared spectrum, the control information is transmitted from the second radio communication node, and the result of the RSSI measurement is received by the first radio communication node in the first cell.

\* \* \* \* \*